(12) United States Patent
Bye

(10) Patent No.: US 12,489,650 B2
(45) Date of Patent: Dec. 2, 2025

(54) SYSTEMS AND METHODS FOR DYNAMIC RATE IDENTIFICATION ALONG A ROUTE OF A USER DEVICE

(71) Applicant: DISH Wireless L.L.C., Englewood, CO (US)

(72) Inventor: Stephen Bye, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 314 days.

(21) Appl. No.: 18/170,317

(22) Filed: Feb. 16, 2023

(65) Prior Publication Data

US 2023/0412409 A1 Dec. 21, 2023

Related U.S. Application Data

(60) Provisional application No. 63/352,568, filed on Jun. 15, 2022.

(51) Int. Cl.
| | | |
|---|---|---|
| *H04L 12/14* | (2024.01) | |
| *H04W 40/02* | (2009.01) | |
| *H04W 40/20* | (2009.01) | |
| *H04W 72/0457* | (2023.01) | |
| *H04W 72/56* | (2023.01) | |

(52) U.S. Cl.
CPC ...... *H04L 12/1403* (2013.01); *H04L 12/1407* (2013.01); *H04L 12/1439* (2013.01); *H04L 12/1442* (2013.01); *H04W 40/026* (2013.01); *H04W 40/20* (2013.01); *H04W 72/0457* (2023.01); *H04W 72/56* (2023.01)

(58) Field of Classification Search
CPC ............... H04W 40/026; H04W 40/20; H04W 72/0457; H04W 72/56; H04W 28/0226; H04L 12/1403; H04L 12/1407; H04L 12/1439; H04L 12/1442; H04M 15/8033
See application file for complete search history.

(56) References Cited

U.S. PATENT DOCUMENTS

| | | | |
|---|---|---|---|
| 10,749,699 B1 * | 8/2020 | Neisinger | H04M 15/57 |
| 11,089,534 B2 * | 8/2021 | Jun | H04W 8/18 |
| 11,553,502 B2 * | 1/2023 | Bisaria | H04W 24/02 |
| 2006/0030291 A1 | 2/2006 | Dawson et al. | |
| 2007/0167174 A1 | 7/2007 | Halcrow et al. | |
| 2012/0190326 A1 | 7/2012 | Mizusawa | |
| 2014/0249747 A1 * | 9/2014 | Kosseifi | G01C 21/3415 |
| | | | 701/428 |
| 2014/0369190 A1 | 12/2014 | Chan et al. | |

(Continued)

*Primary Examiner* — Jenee Holland
(74) *Attorney, Agent, or Firm* — Seed Intellectual Property Law Group LLP

(57) ABSTRACT

A dynamic rate adjustment system receives an indication of a route and one or more network sectors that intersect with the route. The dynamic rate adjustment system determines a time period during which a user device will be located in each network sector and identifies a cost for networking services to be provided to user devices based on the time period. The dynamic rate adjustment system determines a dynamic rate for the user device to use the networking services based on the cost for networking services and causes the user device to transmit user device data based on the dynamic rate when the user device is located within a network sector associated with the dynamic rate.

16 Claims, 13 Drawing Sheets

(56) References Cited

U.S. PATENT DOCUMENTS

| | | | |
|---|---|---|---|
| 2015/0111594 A1* | 4/2015 | Cui | H04W 40/026 |
| | | | 455/453 |
| 2015/0141025 A1* | 5/2015 | Larsson | H04W 84/005 |
| | | | 455/448 |
| 2016/0134761 A1* | 5/2016 | Campbell | H04W 24/10 |
| | | | 370/259 |
| 2016/0337525 A1 | 11/2016 | Da Silva et al. | |
| 2016/0380820 A1 | 12/2016 | Horvitz et al. | |
| 2017/0272972 A1 | 9/2017 | Egner et al. | |
| 2017/0307399 A1* | 10/2017 | Davidsson | G01C 21/3682 |
| 2018/0063336 A1 | 3/2018 | Bolton et al. | |
| 2018/0146101 A1* | 5/2018 | Guha | H04W 4/24 |
| 2018/0146395 A1* | 5/2018 | Kotecha | H04L 43/16 |
| 2019/0222527 A1 | 7/2019 | Fu et al. | |
| 2019/0356498 A1 | 11/2019 | Hernandez Sanchez et al. | |
| 2021/0029612 A1* | 1/2021 | Hassan | G01C 21/3461 |
| 2021/0114616 A1* | 4/2021 | Altman | H04W 76/15 |
| 2021/0212017 A1 | 7/2021 | Bevan et al. | |
| 2021/0258854 A1* | 8/2021 | Bartell | H04L 49/501 |
| 2022/0150794 A1 | 5/2022 | Sparks et al. | |
| 2022/0303867 A1* | 9/2022 | Majmundar | H04W 40/22 |
| 2023/0199612 A1 | 6/2023 | Butler et al. | |

* cited by examiner

SYSTEMS AND METHODS FOR DYNAMIC RATE IDENTIFICATION ALONG A ROUTE OF A USER DEVICE

BACKGROUND

Network operators, such as telecommunication network operators, 4G/5G network operators, private network operators, or other types of network operators that provide user devices with access to networking services, typically bill users for accessing networking services via user devices (or "user equipment") based on a predetermined rate. The predetermined rate does not change even when the network load, device location, or other aspects of the user device, network, or networking services change.

BRIEF SUMMARY

Network operators typically bill users based on a predetermined, or pre-negotiated, rate for access to a network operated by the network operator. The rate may include a variety of aspects, such as a price paid by a user to access the network via devices associated with the user ("user devices"), an amount of data which the user device is able to transmit or receive, or other aspects of a rate set by a network operator for access to a network. However, network operators are unable to dynamically adjust these predetermined rates based on factors affecting the service provided to user devices. These factors may be one or more of: the cost to provide networking services, such as bandwidth costs, costs per byte, kilobyte, megabyte, gigabyte, etc., of transmitting data, and other costs to provide networking services; the location of the user device, such as whether the user device is in an area within which a large number of other user devices are connected to the network, a small number of other user devices are connected to the network, etc.; the effect of the day, time of day, time of week, time of month, time of year, etc., on one or more factors affecting the service; and other factors affecting the service provided to user devices.

Furthermore, user devices are unable to take these factors into account when choosing which data to transmit or receive by using the network services provided by a network. For example, a user device may have data that is of a higher priority, and must frequently be transmitted or received in order for the user device to function. Likewise, a user device may have data which is of a lower priority that does not need to be frequently transmitted or received in order for the device to function. The user device in this example is unable to prioritize the higher priority data, ensure that the higher priority data is processed in a timely manner, etc., when certain factors affecting the network impair the user device's ability to quickly, reliably, etc., transmit and receive the higher priority data.

The embodiments disclosed herein address the issues above and thus help solve the above technical problems and improve the technology for identifying rates for services provided by a network by identifying a dynamic rate based on a variety of factors related to a network. Additionally, the embodiments disclosed herein can enable a user device to change the types of data transmitted by the user device based on the dynamic rate.

In some embodiments, a dynamic rate identification system identifies a user device, receives data from the user device, the data including data describing a location of the user device, identifies a current time, identifies a cost for networking services to be provided to the user device, and determines a dynamic rate for the user device to use the networking services based on the current time, user device data, and the cost for networking services. The dynamic rate may be a price charged to a user associated with the user device for the use of networking services provided by the network.

In some embodiments, a user device transmits one or more types of data via a network, each type of data having a priority, transmits location data to a dynamic rate identification system, receives a dynamic rate from the dynamic rate identification system, determines whether at least one type of data of the one or more types of data should not be transmitted by the user device based on at least the priority of each type of data and the dynamic rate, and causes the user device to temporarily stop transmitting the at least one type of data.

In some embodiments, a dynamic rate identification system receives an indication of a route for a user device, identifies one or more network sectors that the route passes through, and, for each network sector, causes the user device to transmit data based on a dynamic rate at which data is transferred when the user device is located within the respective network sector. The dynamic rate identification system may determine the dynamic rate for each network sector by determining a time period during which the user device is expected to be located within the network sector based on the route and a current location of the user device along the route, identifying a cost for networking services to be provided to the user device at the determined time period, and determine the dynamic rate based on the identified cost for networking services. The one or more network sectors that the route passes through may be any network sector that provides networking services to a user device that travels along the route.

In some embodiments, a dynamic rate identification system receives an indication of a location of a user device, identifies a network sector within which the user device is located based on the location of the user device, identifies a cost for networking services to be provided to the user device based on the location of the user device, determines a dynamic rate for the user device based on the cost for networking services, identifies at least one hotspot within the network sector to which the user device is able to connect, and cause the user device to transmit user device data when the user device is connected to the at least one hotspot. The dynamic rate identification system may identify network sectors that a route of the user device passes through, identify at least one hotspot within the network sectors, and cause the user device to transmit user device data when the user device is able to access the at least one hotspot. The user device data may be transmitted via the at least one hotspot.

DETAILED DESCRIPTION

Figure 1:
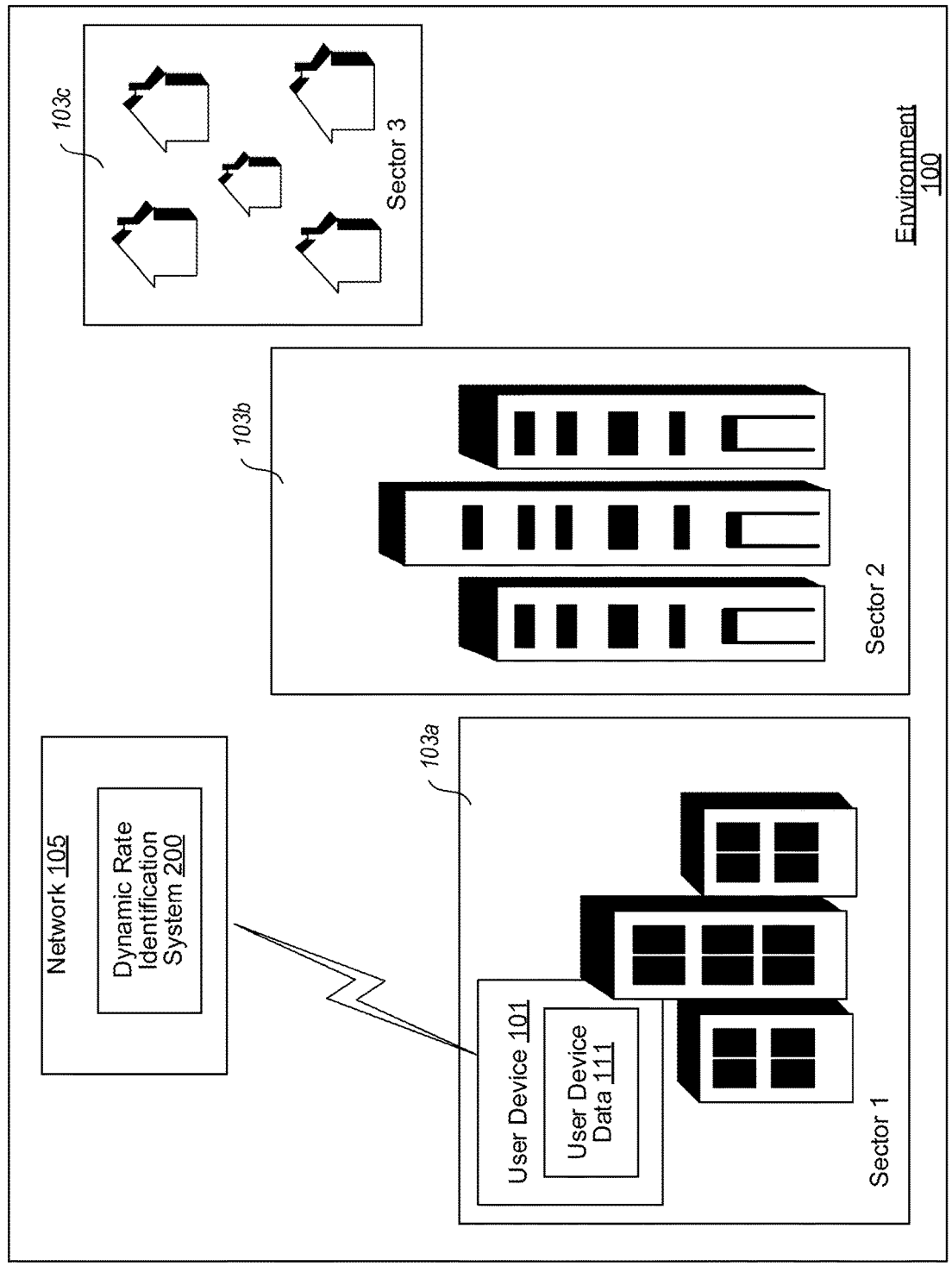
FIG. 1 is a diagram depicting an example environment in which the dynamic rate identification system is implemented.

Network operators, network providers, etc., ("network operators") typically bill users based on predetermined rates for access to a network, or networking services, operated by the network operator. The rate may include various aspects, such as a price paid by a user to access the network via user devices, an amount of data which the user device is able to transmit or receive, or other aspects of a rate set by a network operator for access to a network. However, network operators are unable to dynamically adjust these predetermined rates based on factors affecting the service provided to user devices, such as the location of the user device, the cost to provide networking services, the presence of other devices which are also using the network near the location of the user device, the time that the user device accesses the network, and other factors which may affect the service provided to a user device.

Furthermore, neither the user devices nor the network itself are able to take these factors into account when choosing which data the user device should transmit or receive by using the network services provided by a network. A user device may have different tiers of priority for data transmitted or received by the user device, such as a higher tier for data required to operate the user device or for high-priority functions of the user device, and a lower tier for data related to low-priority functions of the user device. Furthermore, user devices may be required to transmit or receive large quantities of data in order to properly function.

As an example, smart or automated cars typically transmit and receive large amounts of data, in some cases transmitting or receiving multiple gigabytes of data per hour, related to automatically driving or operating the car, such as data collected by sensors included in the car to sense the car's surroundings. The car may transmit and receive the large amount of sensor data, in addition to other data, such as data regarding media consumed by the driver, data regarding maintenance or the status of one or more parts of the car, or other data collected by a car. Without the dynamic rate provided by the dynamic rate identification system, the car is forced to transmit and receive all of these types of data without any clear indication of the current load on the network. Thus, the car may receive and transmit data related to its surroundings at a slower rate than needed in order to automatically drive the car because of the high load on the network and because the car is transmitting and receiving all types of data at once. However, the dynamic rate identification system can calculate a dynamic rate for the car based on the car's location. This dynamic rate can be used to determine whether the car should stop transmitting and receiving lower priority data for a period of time, until the car reaches a certain location, until the car is able to connect to a Wi-Fi network or hotspot, etc., and then resume receiving and transmitting the lower priority data. Thus, the car's high-priority functionality is not impacted, or is minimally impacted, by the network load.

As another example, a user device which is a cellular telephone may transmit and receive data regarding phone calls, applications, SMS or MMS messages, etc., for a user. The user may be entering an urban area during their commute, and may have queued a movie download during their commute, which may be assigned a low priority. A dynamic rate may be used to cause the cellular telephone to pause the movie download until the cellular telephone is able to connect to a less busy cell tower, a Wi-Fi network or hotspot, etc., and then resume downloading the movie, in order to ensure that higher priority functions of the cellular telephone, such as making calls, are able to be minimally impacted by a high network load caused by a large number of commuters traveling to the same urban area.

The embodiments disclosed herein address the issues above and thus help solve the technical problems and improve the technology for identifying rates for services provided by a network by identifying a dynamic rate based on a variety of factors related to a network. Additionally, the embodiments disclosed herein are able to cause a user device to change the types of data transmitted by the user device based on the dynamic rate.

By changing the types of data transmitted by user devices based on the dynamic rate, the embodiments disclosed herein can improve the performance of network resources by ensuring that the overall network load is better distributed over time. For example, applying the dynamic rate to user devices may cause user devices to stop transmitting certain types of data during periods with high network load, and to instead transmit those types of data during times of low network load. As such, the use of dynamic rate described herein can result in reducing the network load during periods of relatively high network loads. Distributing the network load in such a manner can improve the quality of networking services being provided to user devices across the network. Furthermore, applying the dynamic rate to user devices can increase the usage of the network during periods of relatively lower network load, thus ensuring that resources used to ensure that the network is still able to offer a certain quality of service are utilized as much as possible. A period of relatively high network load may include a period of time in which a measure of the network load is greater than a selected threshold measure of the network load. A period of relatively low network load may include a period of time in which a measure of the network load is less than a selected threshold measure of the network load.

In another example, spreading the network load by providing alternate routes for user devices based on the dynamic rate may improve the quality of networking services provided to user devices across the network. In particular, ensuring that network utilization is better distributed across sectors lowers the network utilization in sectors with higher utilization, and raises the network utilization in sectors with lower utilization. When the network utilization of a sector is lowered, access to networking services by user devices located in the sector is improved. Furthermore, raising the network utilization of a sector which is not experiencing high utilization has a minimal impact, if any, on the access to networking services by user devices located in the sector. As such, the system can select one route over another route to utilize the current dynamic rates of different sectors and distribute network load to different sectors. In some embodiments, the route can also be selected based on whether the user device is currently transmitting data or is scheduled to transmit data along the route.

In another example, network load may be reduced by identifying one or more hotspots that a user device may use instead of the network. In some embodiments, the user device may use the hotspots to transmit or receive all or a portion of the data transmitted or received by the user device. For example, the user device may be instructed to transmit or receive low priority data only when the dynamic rate is within a selected threshold or when the user device is able to access a hotspot. By ensuring such data is not transmitted or received by using network resources, the overall network load of the network, in general or in a particular sector, may be reduced. A reduction of the network load is thus able to improve the availability of network resources for other devices connected to the network.

In some embodiments, a dynamic rate identification system identifies a user device, receives data from the user device, the data including data describing a location of the user device, identifies a current time, identifies a cost for networking services to be provided to the user device, and determines a dynamic rate for the user device to use the networking services based on the current time, user device data, and the cost for networking services.

In some embodiments, a dynamic rate identification system identifies one or more sectors of a network, each sector representing a geographic area within which the network is able to provide networking services to user devices, identifies a cost for providing networking services to user devices located within each sector, identifies a change in the cost for providing networking service over time for each sector, identifies a user device, receives data from the user device, the user data including data describing a location of the user device, data describing one or more types of data for which the user device requires or consumes networking services, and data describing a priority measure for each type of data of the one or more types of data, identifies a current time, determines a sector within which the user device is located based on the location of the user device and the identified sectors, determines a dynamic rate for providing networking services to the user based on the current time, the cost for providing networking services to user devices located within the determined sector, and the change in the cost for providing networking services over time within the determined sector, determines whether the user device should not transmit at least one type of data of the one or more types of data based on the priority measure for each type of data and the dynamic rate, and causes the user device to not transmit the at least one type of data.

In some embodiments, the dynamic rate identification system receives updates regarding the location of the user device. The updates may be received over a period of time, received periodically, received for a predetermined amount of time, received at predetermined time intervals, etc. The dynamic rate identification system may use an update to determine a new sector within which the user device is located, determine a new current time, determine a new dynamic rate for the user device, or any combination of the three.

In some embodiments, the dynamic rate identification system receives an indication of a route of the user device, the route including one or more potential future locations of the user device. The dynamic rate identification system may determine a dynamic rate based on the potential future locations included in the route. The dynamic rate identification system may predict a plurality of dynamic rates for the user device. The predicted dynamic rates may be used to cause the user devices to pause or resume transmitting or receiving data as the user device moves along the route. For example, the user device may pause transmitting and receiving low priority data between locations A and B, resume transmitting and receiving low priority data between locations B and C, and pause transmitting and receiving the low priority data again between locations C and D. The route may be a predicted route of the user device, a known route of the user device, a planned route of the user device, or any other type of route taken by the user device.

In some embodiments, a user device transmits one or more types of data via a network, each type of data having a priority, transmits location data to a dynamic rate identification system, receives a dynamic rate from the dynamic rate identification system, determines whether at least one type of data of the one or more types of data should not be transmitted by the user device based on at least the priority of each type of data and the dynamic rate, and causes the user device to temporarily stop transmitting the at least one type of data.

In some embodiments, the dynamic rate identification system identifies one or more low-cost networks, hotspots, etc., such as, for example, a user's home Wi-Fi network, a public Wi-Fi network made available for free by an entity other than a user, or other low-cost networks or hotspots which a device can use to access the Internet, (collectively "hotspots") within a sector. The dynamic rate identification system may cause the user device to connect to a hotspot and resume transmitting and receiving types of data whose transmission and reception have been paused due to the dynamic rate. The dynamic rate identification system may pause the transmission and reception of the types of data after the user device is disconnected from the hotspot. The dynamic rate identification system may identify the hotspots based on data stored by the user device indicating one or more hotspots to which the user device has previously connected. The dynamic rate identification system may identify the hotspots through a partnership between the network operator, the user, a manufacturer of the user device, etc., and an entity providing the hotspots.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

FIG. 1 is a diagram depicting an example environment 100 in which the dynamic rate identification system 200 is implemented. The environment 100 includes a user device 101, sectors 103a-103c, a network 105, and a dynamic rate identification system 200. The dynamic rate identification system 200 is further described with respect to FIG. 2. It is to be appreciated that FIG. 1 illustrates just one example of an environment 100 and that the various embodiments discussed herein are not limited to the use of such an environment. For example, in some embodiments, the environment 100 may include additional or fewer of each of the user devices, sectors, networks, and dynamic rate identification systems described in connection with the environment 100.

The user device 101 may be or include one or more devices, such as vehicles (for example, cars, trucks, autonomous vehicles, or another type of vehicle), cellular telephones, smartphones, tablets, personal computers, laptop computers, drones, or any other device configured to communicate over a network 105 which may move through time and space. The user device 101 may interconnect to one or more communications media or sources, such as routers, network switches, modems, etc., to transmit communications to other devices. The user device 101 may include user device data 111. The user device data 111 includes data used by the user device to perform its functions, such as sensor data, user data, applications, an operating system, etc. The user device data 111 additionally includes data describing the types of data that the user device 101 transmits and receives via network services. The user device data 111 additionally includes data describing a priority measure for each type of data that the user device 101 transmits and receives via network services. The priority measure may indicate that the type of data is prioritized based on one or more tiers, such as, for example, high priority, medium priority, low priority, etc. Data from the same source may have multiple assignable priorities depending on the content of the data. For example, sensor data collected on a normally operating component of a vehicle may be assigned as low priority. However, data from the same sensor which detects an abnormal condition may be assigned a higher priority.

The sectors 103a-103c each represent a sector that receives networking services from a network, such as a network 105. Each sector 103 represents a geographic area within which the network provides networking services, such as a city, an area of network coverage provided by one or more cell towers, or other types of geographic areas. A sector 103 may be described based on the network load of one or more particular cell towers within the sector. Further, each sector 103 may be described based on the type of area it represents, such as suburban, urban, rural, city center, city residential area, highway, or other types of area which describe a geographic location.

The network 105 is a network, communication system, or networked system (not shown), which the user device 101 and other devices (not illustrated) may use to communicate via one or more wireless or wired communication technologies. Non-limiting examples of such a network 105 include, but are not limited to, an Ethernet system, twisted pair Ethernet system, an intranet, a local area network (LAN) system, short range wireless network (e.g., Bluetooth®), a personal area network (e.g., a Zigbee network based on the IEEE 802.15.4 specification), a Consumer Electronics Control (CEC) communication system, Wi-Fi, satellite communication systems and networks, cellular networks, cable networks, 4G/5G/6G network, or the like. One or more user devices 101, such as PCs, tablets, laptop computers, smartphones, personal assistants, Internet connection devices, wireless LAN, Wi-Fi, Worldwide Interoperability for Microwave Access (WiMAX) devices, or the like, may be communicatively coupled to the network 105 and/or to each other so that the plurality of user devices are communicatively coupled together. Thus, such a network 105 enables the user device 101 to use the network 105 to transmit or receive data from other computing devices, servers, user devices, or other devices, computers, or systems, connected to a network.

In the depiction of the environment 100 in FIG. 1, the network 105 may collect data regarding each of the sectors 103a-103c, such as a number of user devices in a sector over a period of time (such as throughout a day, week, month, etc.), a cost to provide services to user devices over the period of time, and other data related to providing network services to user devices within each sector 103a-103c. The data regarding each sector 103a-103c may be analyzed by a dynamic rate identification system, such as by using statistical analysis, machine learning models, artificial intelligence, etc., to generate dynamic rates which may be billed to user devices when the user device uses network services within a sector at certain times. In some embodiments, the dynamic rate identification system 200 collects the data regarding each of the sectors 103a-103c. The dynamic rate identification system 200 may obtain the location of the user device 101, such as by receiving the location from the user device, triangulating the user device location, or other methods of obtaining the location of a user device. The dynamic rate identification system 200 may identify the sector within which the user device 101 is located and generate a dynamic rate for the user device based on the location of the user device and the data regarding the identified sector. The dynamic rate is used to determine whether the user device should pause transmitting or receiving one or more types of data.

In some embodiments, the dynamic rate is used to determine whether the user device should pause transmitting or receiving one or more types of data along with one or more of: a current network load of at least one cell tower, a predicted network load of at least one cell tower, a measure of the network coverage in an area in which the user device currently is located or is predicted to be located, a scheduled or predicted path of the user device, and other factors which may influence a determination of whether the user device should pause transmitting or receiving one or more types of data. For example, the user device may pause transmitting low priority data as it travels along a route, but may resume transmitting the low priority data while it is connected to a cell tower along the route which is currently experiencing a low network load. In another example, the user device may pause transmitting or receiving the data of a certain priority, such as the lowest priority data, unless the user device is connected to a hotspot or a cell tower experiencing unusually low network load. Furthermore, the network load of the cell towers may be predicted based on a future location of the user device, a predicted time the user device would be connected to the cell tower, historical data describing the network load of the cell tower, data describing the current network load of the cell tower, or other data used to predict network load for a cell tower. Additionally, while each of these examples describe individual cell towers, the dynamic rate identification system may use any description or representation of a geographic area, such as the sectors 103 described above, in the same or a similar manner.

The above description of the environment 100, and the various networks, devices, and functions therein, is intended as a broad, non-limiting overview of an example environment in which various embodiments of a dynamic rate identification system can operate. The environment 100, and the various devices therein, may contain other devices, systems and/or media not specifically described herein. The environment 100, and the various functions therein, may contain other functions, systems and/or media not specifically described herein.

Example embodiments described herein provide applications, tools, data structures, and other support to implement systems and methods for identifying a dynamic rate for a user device to use network services, such as the user device 101 and network 105 respectively. The example embodiments described herein additionally provide applications tools, data structures, and other support to implement systems and methods for determining whether the device should stop transmitting or receiving one or more types of data based on the dynamic rate. Other embodiments of the described techniques may be used for other purposes, such as determining a plurality of dynamic rates for a route traveled by a user device. The embodiments described herein may also be used for determining when the device should resume transmitting or receiving the one or more types of data. In the description provided herein, numerous specific details are set forth in order to provide a thorough understanding of the described techniques. The embodiments described also can be practiced without some of the specific details described herein, or with other specific details, such as changes with respect to the ordering of processes or devices, different processes or devices, and the like. Thus, the scope of the techniques and/or functions described are not limited by the particular order, selection, or decomposition of steps described with reference to any particular module, component, or routine.

Figure 2:
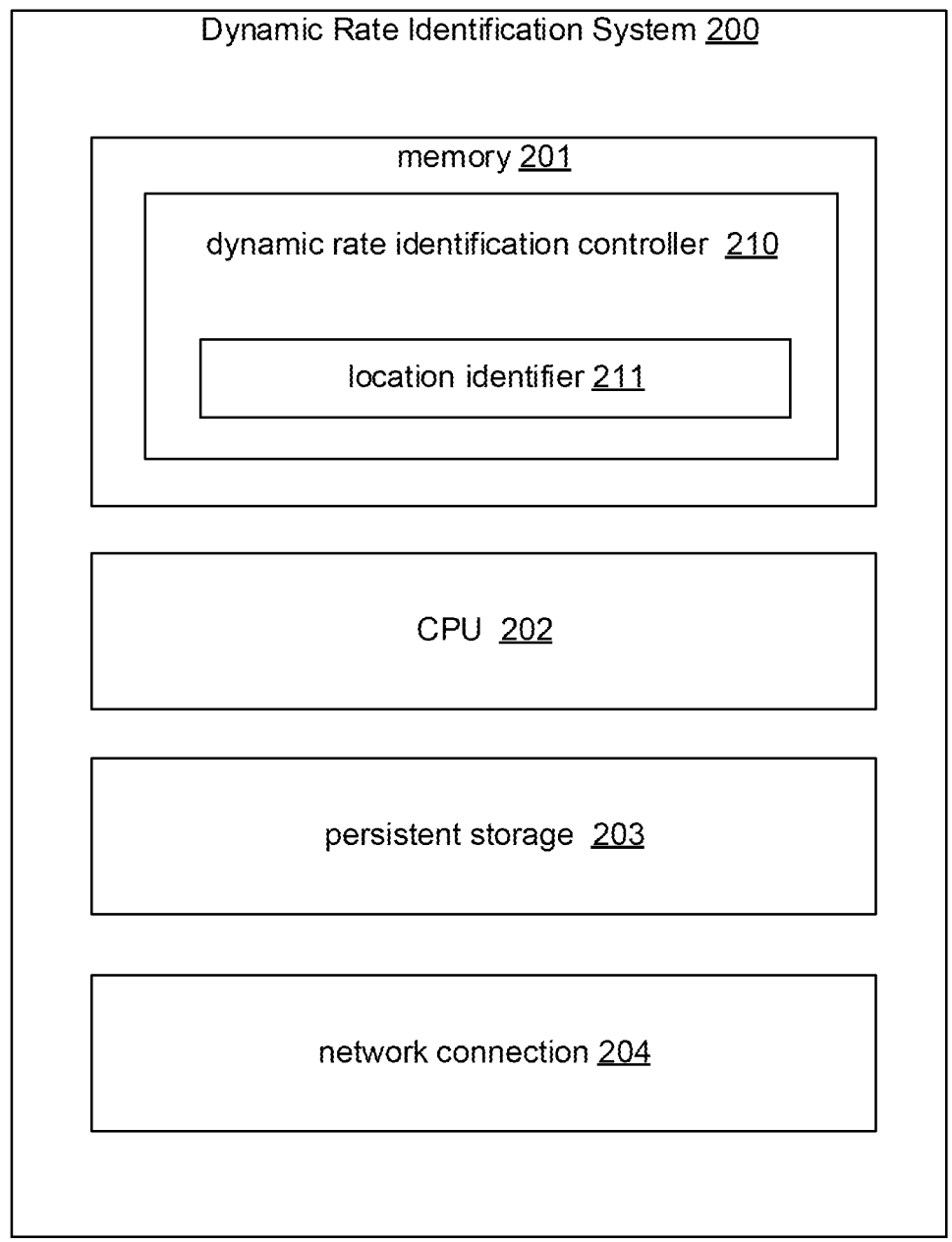
FIG. 2 is a block diagram depicting example components incorporated in a dynamic rate identification system, according to various embodiments described herein.

FIG. 2 is a block diagram depicting example components incorporated in a dynamic rate identification system 200, according to various embodiments described herein. In various embodiments, the dynamic rate identification system 200 includes one or more of the following: a computer memory 201 for storing programs and data while they are being used, including data associated with sectors of the network, such as sectors 103a-103c, a network, such as the network 105, user devices, such as the user device 101, an operating system including a kernel, and device drivers; a central processing unit (CPU) 202 for executing computer programs; a persistent storage device 203, such as a hard drive or flash drive for persistently storing programs and data; and a network connection 204 for connecting to one or more computer devices, functions or components of the network 105, user devices, such as the user device 101, devices implementing a hotspot, other systems in the telecommunication network, and/or other computer systems, to send and/or receive data, such as via the Internet or another network and associated networking hardware, such as switches, routers, repeaters, electrical cables and optical fibers, light emitters and receivers, radio transmitters and receivers, and the like. In various embodiments, the dynamic rate identification system 200 additionally includes input and output devices, such as a keyboard, a mouse, display devices, etc. Aspects of the dynamic rate identification system 200 may be implemented as part of the network (such as a network core, an edge computing resource for the network, or other computing resources available to a network), the user device, or some combination thereof.

While a dynamic rate identification system 200 configured as described may be used in some embodiments, in various other embodiments, the dynamic rate identification system 200 may be implemented using devices of various types and configurations, and having various components. The memory 201 may include a roaming dynamic rate identification controller 210 which contains computer-executable instructions that, when executed by the CPU 202, cause the dynamic rate identification system 200 to perform the operations and functions described herein. For example, the programs referenced above, which may be stored in computer memory 201, may include or be comprised of such computer-executable instructions.

The dynamic rate identification controller 210 performs the core functions of the dynamic rate identification system 200, as discussed herein and also with respect to FIGS. 3 through 11. Aspects of the dynamic rate identification controller 210 which perform the functions of the dynamic rate identification system 200 may be implemented as part of the network (such as a network core, an edge computing resource for the network, or other computing resources available to a network), the user device, or some combination thereof. In particular, the dynamic rate identification controller 210 determines a dynamic rate for a user device based on the current attributes of a sector, such as a cost for providing network services to user devices located within the sector, a change in the cost for providing networking services over time, and a current time that the user device is located within the sector. Additionally, the dynamic rate identification controller 210 may determine a type of data the user device should pause or stop transmitting or receiving based on the determined dynamic rate and a priority measure of the type of data. Furthermore, the dynamic rate identification controller 210 may determine one or more dynamic rates for a user device based on a path or route of the user device. The dynamic rate identification controller 210 may determine a dynamic rate based on statistical analysis, artificial intelligence, a machine learning model, etc. For example, the dynamic rate identification controller 210 may train a machine learning model to predict a dynamic rate based on one or more of: a change in the cost for providing networking network services to a user device within a sector; a location of a sector; a temporal variable for determining the rate, such as a day, time of day, etc.; a speed of the user device; or other attributes used to determine a dynamic rate for a user device. As another example, the dynamic rate identification controller 210 may perform statistical analysis on the data used to determine dynamic rates to identify an equation or curve used to calculate a dynamic rate based on one or more of: a change in the cost for providing networking network services to a user device within a sector; a location of a sector; a temporal variable for determining the rate, such as a day, time of day, etc.; a speed of a user device; or other attributes used to determine a dynamic rate for a user device.

The dynamic rate identification controller 210 may include a location identifier 211. The location identifier 211 may be used to determine a current location of a user device, a change in the location of a user device over time, or other aspects of the user device related to its location. The location identifier 211 may determine a location of the user device based on one or more of: a location provided by the user device, such as via GPS or other spatial coordinates; a location determined by network equipment within the sector which transmits or receives data related to the user device; and other methods of determining a location of a user device.

In some embodiments, the data collected by the location identifier 211 is used to determine a speed of the user device. The dynamic rate identification system 200 may use the data collected by the location identifier 211 to determine a speed of the user device by identifying the distance traveled by the user device over a period of time. The determined speed of the user device may be used to determine the dynamic rate applied to the user device. For example, a first dynamic rate may be applied to the user device while it is moving at 60 miles per hour, and a second dynamic rate may be applied to the user device while it is stationary.

In an example embodiment, the dynamic rate identification controller 210 and/or computer-executable instructions stored on memory 201 of the dynamic rate identification system 200 are implemented using standard programming techniques. For example, the dynamic rate identification controller 210 and/or computer-executable instructions stored on memory 201 of the dynamic rate identification system 200 may be implemented as a "native" executable running on CPU 202, along with one or more static or dynamic libraries. In other embodiments, the dynamic rate identification controller 210 and/or computer-executable instructions stored on memory 201 of the dynamic rate identification system 200 may be implemented as instructions processed by a virtual machine that executes as some other program.

The embodiments described above may also use synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented or performed by each component or module, and in different orders, and by different components/modules, yet still achieve the functions of the dynamic rate identification system 200.

In addition, programming interfaces to the data stored as part of the dynamic rate identification controller 210 can be available by standard mechanisms such as through C, C++, C#, Java, and Web APIs; libraries for accessing files, databases, or other data repositories; through scripting languages such as JavaScript and VB Script; or through Web servers, FTP servers, or other types of servers providing access to stored data. The dynamic rate identification controller 210 may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions of the dynamic rate identification system 200, user device 101, and network 105.

Furthermore, in some embodiments, some or all of the components/portions of the dynamic rate identification controller 210, and/or functionality provided by the computer-executable instructions stored on memory 201 of the dynamic rate identification system 200 may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., as a hard disk; a memory; a computer network or cellular wireless network; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Such computer program products may also take other forms in other embodiments. Accordingly, embodiments of this disclosure may be practiced with other computer system configurations.

In general, a range of programming languages may be employed for implementing any of the functionality of the servers, functions, user equipment, etc., present in the example embodiments, including representative implementations of various programming language paradigms and platforms, including but not limited to, object-oriented (e.g., Java, C++, C#, Visual Basic .NET, Smalltalk, and the like), functional (e.g., ML, Lisp, Scheme, and the like), procedural (e.g., C, Pascal, Ada, Modula, and the like), scripting (e.g., Perl, Ruby, PHP, Python, JavaScript, VB Script, and the like) and declarative (e.g., SQL, Prolog, and the like).

Figure 3:
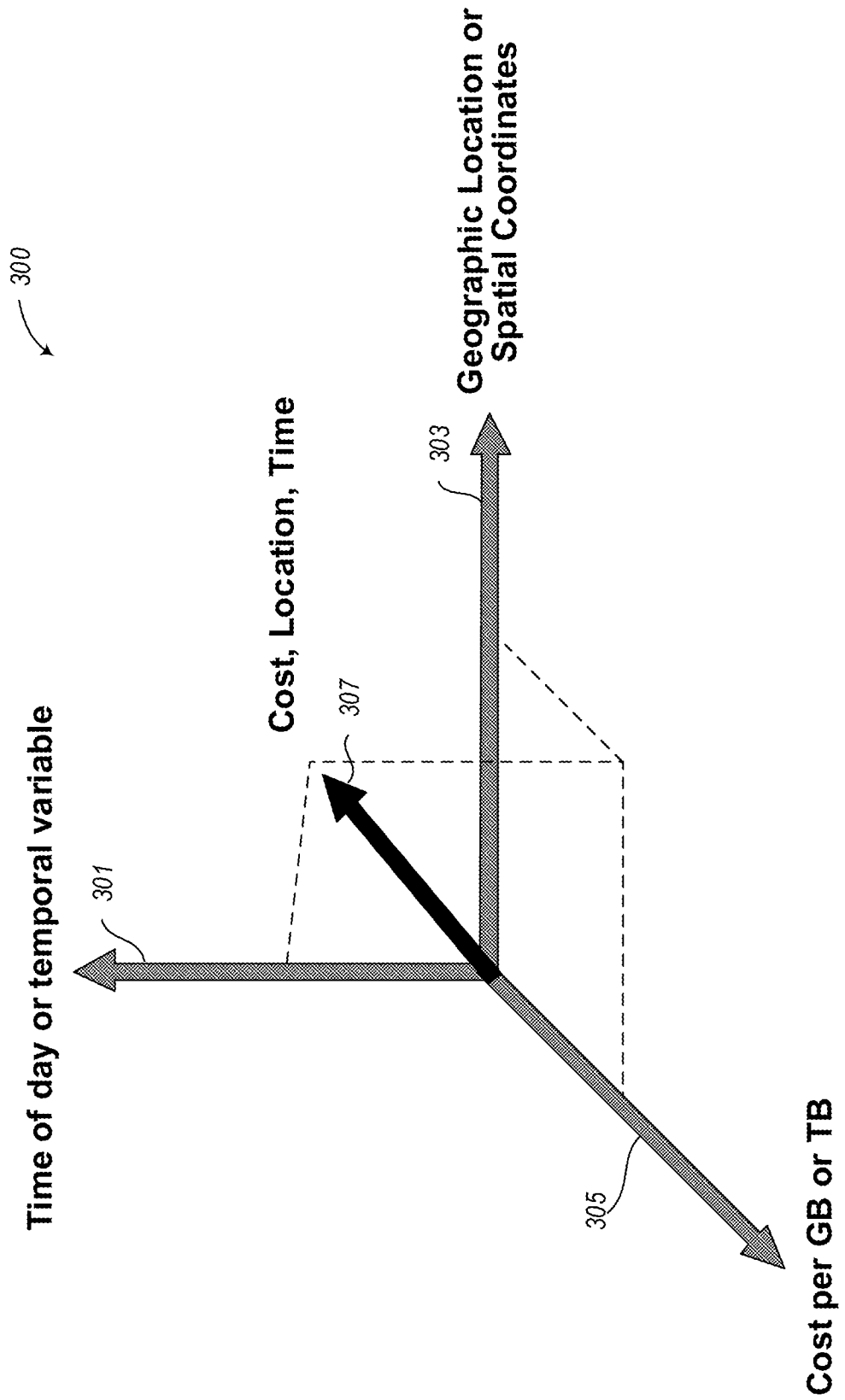
FIG. 3 is a graph diagram depicting a multi-dimensional graph of a dynamic rate, according to various embodiments described herein.

FIG. 3 is a graph diagram depicting a multi-dimensional graph 300 of a dynamic rate, according to various embodiments described herein. Although the graph 300 includes three axes each representing an attribute of a sector used to determine the dynamic rate, additional or fewer axes representing one or more other attributes of a sector may be used to determine the dynamic rate. Furthermore, while the multi-dimensional graph 300 shows a representation of a relationship between the attributes which could be used to determine the dynamic rate, the dynamic rate identification system 200 may use other methods of determining a dynamic rate, and is not required to use a graph, such as the multi-dimensional graph 300, to determine the dynamic rate.

Thus, while a graph such as the multi-dimensional graph 300 may be used to determine the dynamic rate, the multi-dimensional graph 300 is used to visually depict the relationship between attributes used to determine the dynamic rate.

The multi-dimensional graph 300 includes a temporal variable axis 301, a location axis 303, and a cost for network services axis 305. The multi-dimensional graph 300 additionally includes a dynamic rate line 307. The temporal variable axis 301 represents temporal data, such as a time of day, day of week, week of month, day of month, etc. The location axis 303 represents a location, such as a geographic location, spatial coordinates, a group of coordinates representing a location, an altitude, or other methods of identifying a geographic location or area. The cost for network services axis 305 represents the cost to provide networking services to a user, such as: a cost per byte, kilobyte, megabyte, gigabyte, terabyte, etc.; a cost for network infrastructure; a measure of the current load on the network; or other costs which may be related to providing networking services to a user. The dynamic rate line 307 represents a function of cost to provide network services, location of a user device, and a time.

In some embodiments, the multi-dimensional graph includes additional axes representing additional attributes used for determining the dynamic rate. For example, the multi-dimensional graph may include a representation of the historical behavior of the user device to which the dynamic rate is to be applied. In another example, the multi-dimensional graph may include a representation of the speed of the user device. By taking into account the speed of the user device, the dynamic rate is able to represent the rate at which new resources need to be allocated to the device as it travels through network sectors.

Figure 4:
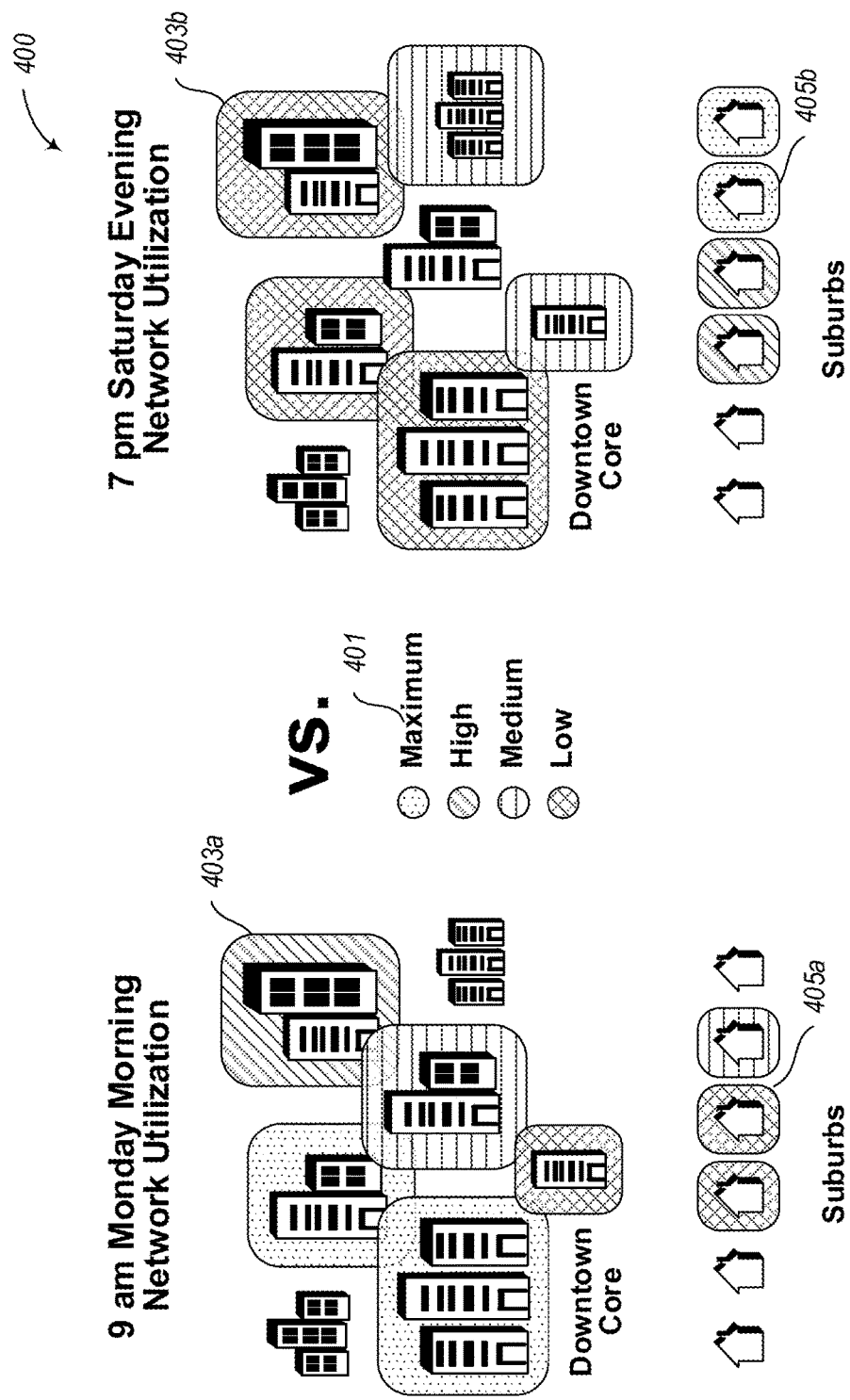
FIG. 4 is a display diagram depicting a sample network utilization over time, according to various embodiments described herein.

FIG. 4 is a display diagram depicting a sample network utilization over time 400, according to various embodiments described herein. FIG. 4 includes usage indicators 401, a representation of a downtown core 403a and 403b, and a representation of suburbs 405a and 405b. The usage indicators 401 indicate the utilization of network services in each of the downtown core 403a and 403b and suburbs 405a and 405b. The cores 403a and 403b and the suburbs 405a and 405b are example embodiments of the sectors 103a-103c described above in connection with FIG. 1.

In the example depicted in FIG. 4, at 9:00 AM on Monday morning, a majority of the downtown core 403a experiences high network utilization, as depicted by the utilization indicators in each of the depicted buildings in the downtown core 403a. Likewise, at the same time the majority of the suburbs 405a experience low network utilization. In contrast, at 7:00 PM on Saturday evening, the majority of the downtown core 403b experiences low utilization, while the majority of the suburbs 405b experience high utilization.

Thus, in this example, the dynamic rate identification system may calculate a higher dynamic rate for a user device located in the downtown core 403a or suburbs 405b and a lower dynamic rate for a user device located in the suburbs 405a and downtown core 403b. These dynamic rates may be used to determine whether user devices in each of the areas should pause or resume transmitting or receiving certain types of data. Furthermore, the dynamic rates may be used to instruct user devices to transmit or receive certain types of data only when the user device is connected to a hotspot.

Figure 5:
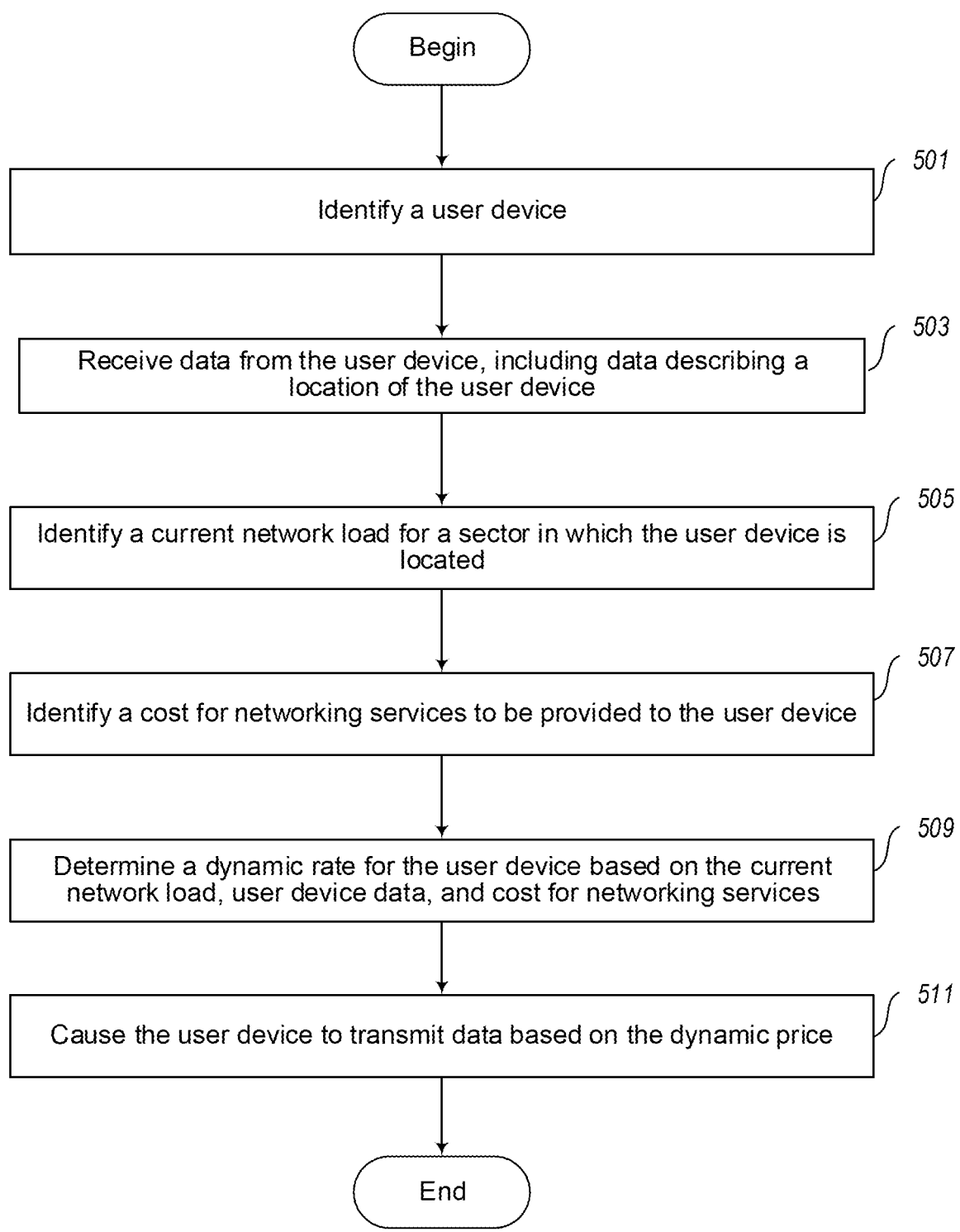
FIG. 5 is a flow diagram depicting a process to determine a dynamic rate for a user device, according to various embodiments described herein.

FIG. 5 is a flow diagram depicting a process to determine a dynamic rate for a user device, according to various embodiments described herein. The process described in FIG. 5 may be performed by a dynamic rate identification system, such as the dynamic rate identification system 200. First, at act 501, a dynamic rate identification system, such as the dynamic rate identification system 200 in FIGS. 1 and 2, identifies a user device. The user device may be a car, cellular telephone, laptop, tablet, drone, or any other type of user device, such as the user device 101 in FIG. 1.

At act 503, the dynamic rate identification system receives data from the user device, including data describing a location of the user device, and, if available, a projected path of travel for the user device. The data received from the user device may include one or more of: an indication of the type of data that the user device transmits or receives and an indication of one or more priority measures for a plurality of the types of data that the user device transmits or receives. In some embodiments, the dynamic rate identification system determines at least one priority measure for at least one type of data that the user device transmits or receives based on one or more of: one or more functions of the user device, the type of data, an indication from a user of the user device that the type of data should be prioritized, or other indicators of the importance of a type of data for the functionality of a user device.

At act 505, the dynamic rate identification system identifies a current network load of a sector in which the user device is located. In some embodiments, the dynamic rate identification system identifies the sector in which the user device is located based on the data received in act 503. At act 507, the dynamic rate identification system identifies a cost for networking services to be provided to the user device. In some embodiments, the cost for networking services to be provided to the user device is determined based on the current network load of the sector in which the user device is located.

At act 509, the dynamic rate identification system determines a dynamic rate for the user device based on one or more of: the current network load, the user device data, and the cost for networking services. In some embodiments, the dynamic rate identification system uses historical usage data for the user device to determine the dynamic rate. The historical usage data may include data describing when the user device typically accesses the network, the type of data transmitted or received when the user device accesses the network, the amount of data transmitted or received when the user device accesses the network, the length of time that the user device spends transmitting or receiving data, or other data that indicates a pattern of the user device's usage of network resources. For example, a user device which typically uses network resources in the morning, but not at night, may receive a dynamic rate that is higher in the morning and lower at night.

In some embodiments, at act 509, the dynamic rate identification system uses a speed of the user device to determine the dynamic rate. For example, a user device which is predicted to travel through network sectors at high speed based on the current speed of the user device may have a higher dynamic rate than if the user device was predicted to travel through network sectors at a lower speed.

At act 511, the dynamic rate identification system causes the user device to transmit data based on the dynamic rate. In some embodiments, causing the user device to transmit data based on the dynamic rate includes one or more of: transmitting an indication of the dynamic rate to the user device, transmitting an indication of one or more types of data which the user device should pause or resume transmitting, transmitting instructions to the user device to determine one or more types of data which the user device should stop or resume transmitting based on the dynamic rate, or other methods of causing a user device to transmit data based on a dynamic rate.

In some embodiments, the dynamic rate determined in act 509 may be used to reserve network capacity for the user device. The dynamic rate may be used to reserve network capacity based on movement of the user device, an indication of the user device's usage of network capacity, or other methods of determining whether to reserve network capacity based on a dynamic rate. For example, a dynamic rate which indicates that the user device is likely to travel through multiple network sectors may be used to reserve network capacity for the user device at those network sectors when the user device is predicted to pass through the network sectors. In some embodiments, the dynamic rate identification system reserves network capacity by using network slices.

After act 509, the process ends.

Figure 6:
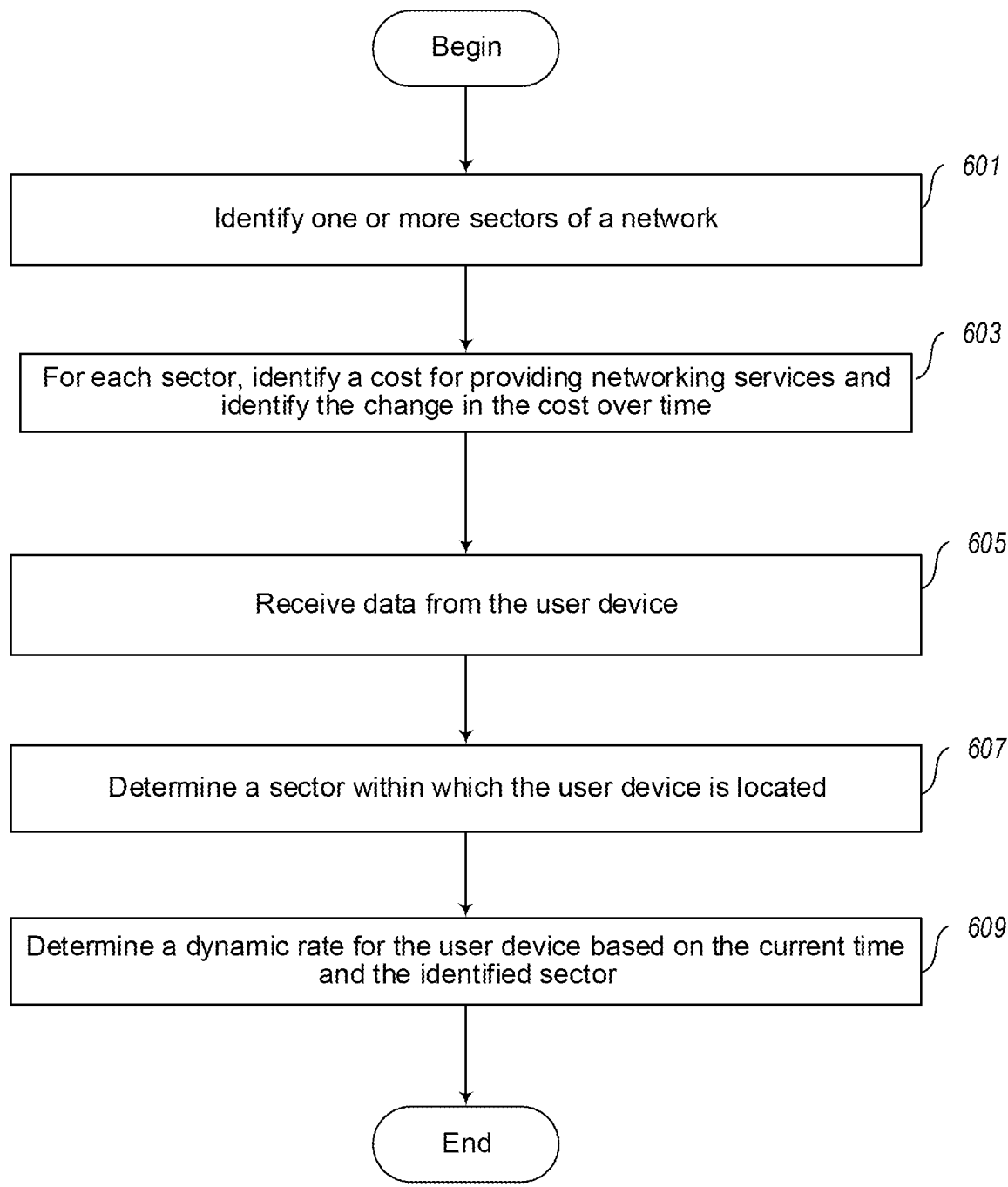
FIG. 6 is a flow diagram depicting a process to determine a dynamic rate for a user device based on a sector within which the user device is located, according to various embodiments described herein.

FIG. 6 is a flow diagram depicting a process to determine a dynamic rate for a user device based on a sector within which the user device is located, according to various embodiments described herein. The process described in FIG. 6 may be performed by a dynamic rate identification system, such as the dynamic rate identification system 200. First, at act 601, the dynamic rate identification system identifies one or more sectors of a network. The sectors may represent geographic areas within the network's coverage, such as urban areas, suburban areas, rural areas, areas which are provided networking services by one or more cell towers, etc.

At act 603, the dynamic rate identification system identifies a cost for providing networking services and identifies a change in the cost to provide networking services over time for each sector. The dynamic rate identification system may perform act 603 based on historical data describing the cost for providing networking services in the sector and/or based on a current, or "live," usage of networking resources in the sector. The historical data may be periodically updated to include present costs for providing networking services. The historical data may be historical data for: an entire sector; a portion of a sector; multiple sectors which share an attribute, such as being rural, urban, suburban, etc.; for one or more locations defined by geographic coordinates, such as Global Positioning System coordinates; or other historical data which may be useful for determining a change in the cost over time to provide networking services for a user device. The historical data may include data related to the amount of user devices connected to the network during one or more periods of time. The historical data may include data related to the amount of bandwidth used by user devices connected to the network during one or more periods of time. In some embodiments, the historical data includes data describing a pattern of the user device's usage of network resources.

At act 605, the dynamic rate identification system receives user device data from a user device. At act 607, the dynamic rate identification system determines a sector within which the user device is located based on the user device data and the identified sectors.

At act 609, the dynamic rate identification system determines a dynamic rate for the user device based on the identified sector. In some embodiments, the dynamic rate identification system may additionally determine the dynamic rate based on one or more of: a current time, the current cost for providing networking services in the identified sector, historical data related to the cost for providing networking services in the identified sector, and a path or route along which the user device travels or is expected to travel.

In some embodiments, at act 609, the dynamic rate identification system determines the dynamic rate based on a future network load for a network sector. For example, the dynamic rate identification system may access historical data regarding the network load for the network sector and may predict a future network load based on historical data and a time that the user device is projected to be using networking services provided by the network sector. The dynamic rate identification system may determine a cost for networking services based on the predicted future network load for the network sector, and the cost for networking services may be used to determine the dynamic rate.

After act 609, the process ends.

Figure 7:
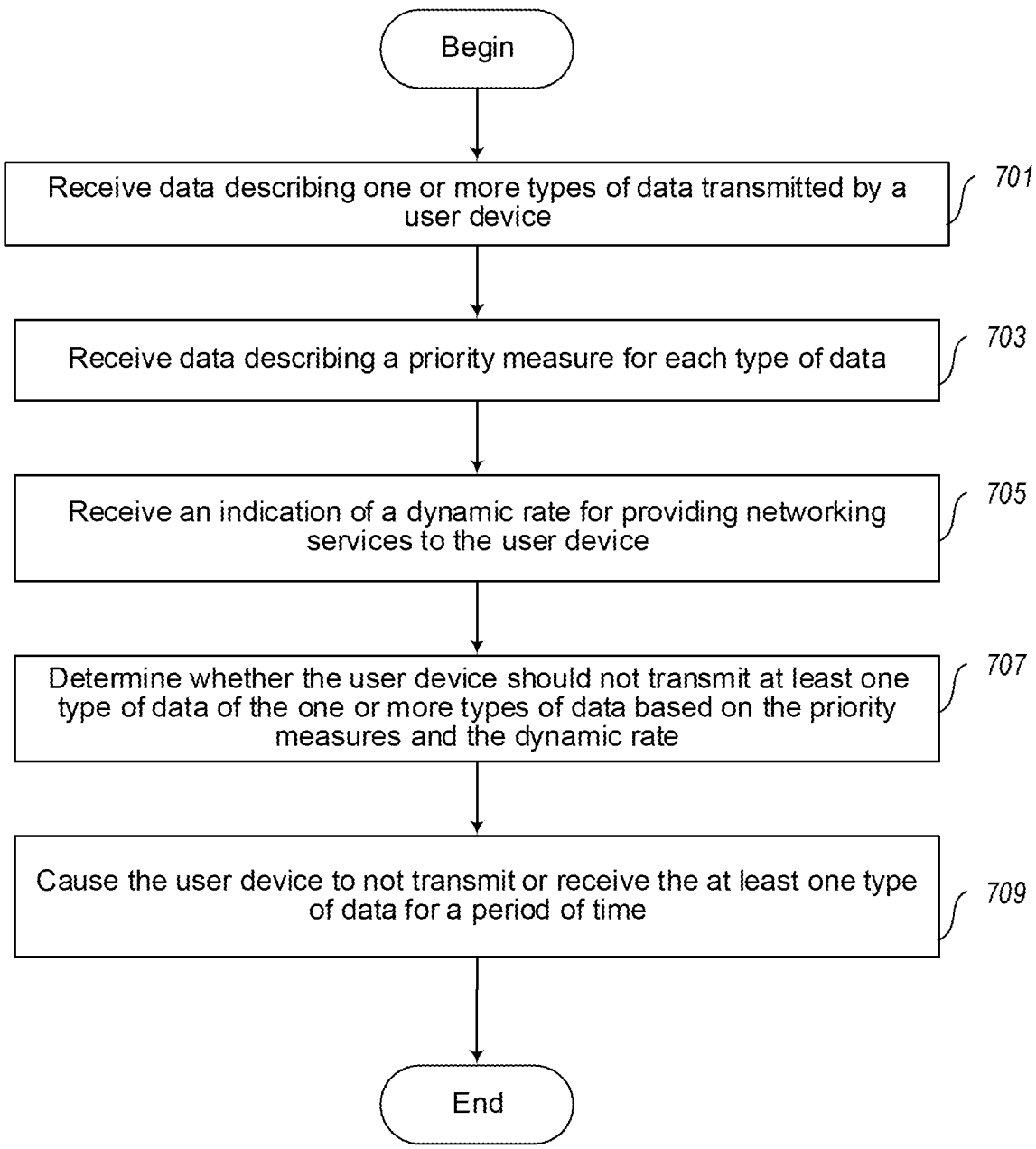
FIG. 7 is a flow diagram depicting a process for causing a user device not to transmit or receive at least one type of data, according to various embodiments described herein.

FIG. 7 is a flow diagram depicting a process for causing a user device not to transmit or receive at least one type of data, according to various embodiments described herein. The process described in FIG. 7 may be performed by a dynamic rate identification system, such as the dynamic rate identification system 200. First, at act 701, the dynamic rate identification system receives data describing one or more types of data transmitted by a user device.

At act 703, the dynamic rate identification system receives data describing a priority measure for each type of data of the one or more types of data. In some embodiments, the dynamic rate identification system receives data describing a priority measure for a portion of the one or more types of data. The priority measure may be a numeric measure, a textual indication of a measure, etc. The priority measure may indicate that a type of data is within one tier of priority of a plurality of tiers of priority. For example, types of data in a lower tier of priority may be less prioritized than types of data in a higher tier of priority.

At act 705, the dynamic rate identification system receives an indication of a dynamic rate for providing networking services to the user devices. At act 707, the dynamic rate identification system determines whether the user device should not transmit at least one type of data based on the priority measures for each of the one or more types of data and the dynamic rate. In some embodiments, the dynamic rate identification system additionally determines whether the user device should not transmit at least one type of data based on an indication of the current network load. The indication of the current network load may be obtained from the network, such as the network 105. The indication of the current network load may be determined by the dynamic rate identification system based on at least the dynamic rate or the data used to determine the dynamic rate. For example the dynamic rate identification system may compare the dynamic rate to previous rates to determine the current load of the network.

At act 709, the dynamic rate identification system causes the user device to not transmit or receive the at least one type of data. The dynamic rate system may cause the user device not to transmit or receive the at least one type of data for a period of time, until the device is nearby or connected to a hotspot, until the user device has changed locations or sectors, until a new dynamic rate is calculated for the user device, etc.

After act 709, the process ends. While the process 700 is described as being performed by the dynamic rate identification system, in some embodiments, the user device performs all or some of the acts described in the process 700.

Figure 8:
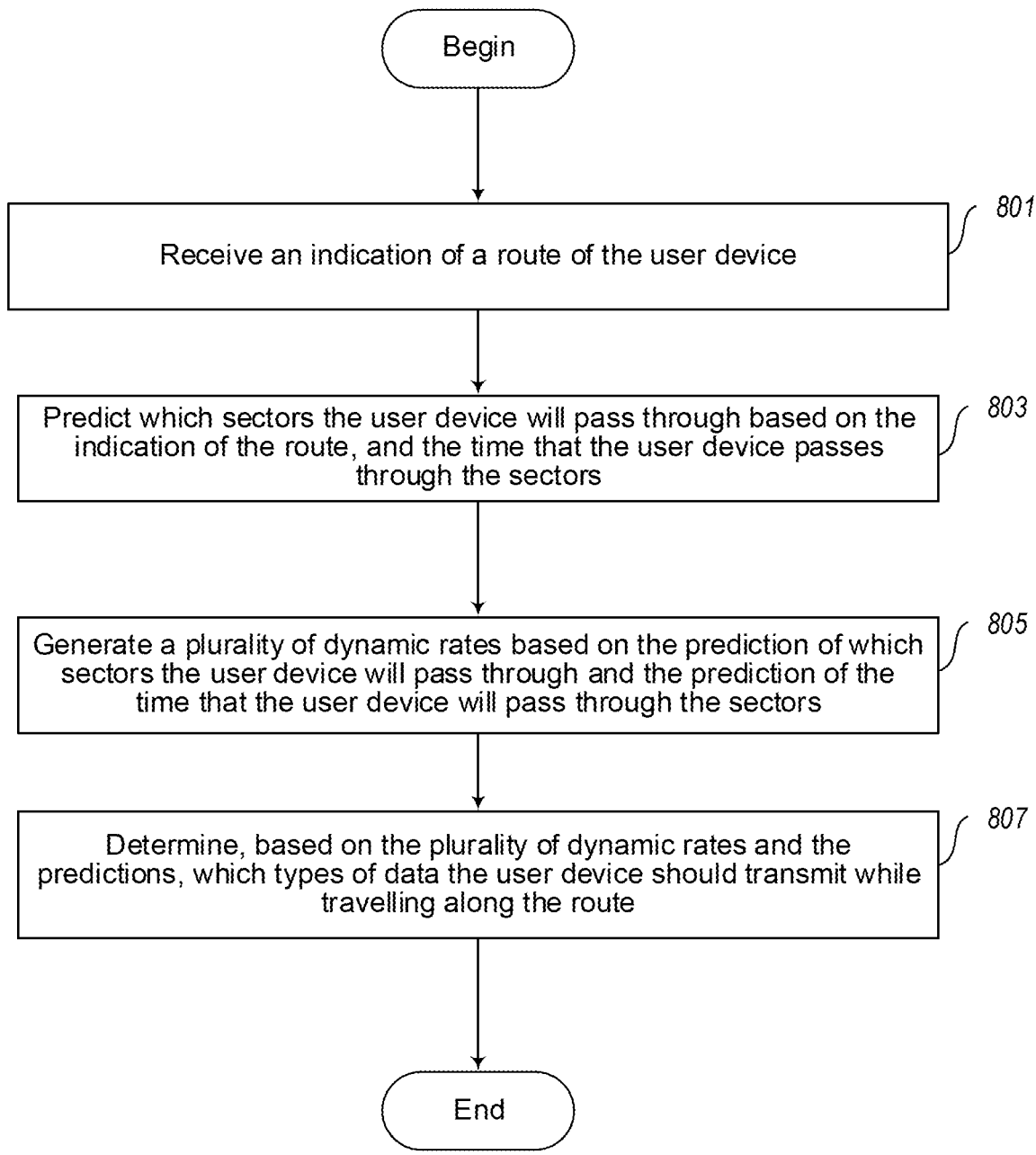
FIG. 8 is a flow diagram depicting a process to determine a dynamic rate for a user device based on a route of the user device, according to various embodiments described herein.

FIG. 8 is a flow diagram depicting a process to determine a dynamic rate for a user device based on a route of the user device, according to various embodiments described herein. The process described in FIG. 8 may be performed by a dynamic rate identification system, such as the dynamic rate identification system 200. First, at act 801, the dynamic rate identification system receives an indication of a route of the user device. The route may be a planned route, a predicted route, a current route, etc., which will be, or is currently being, travelled by a user device.

At act 803, the dynamic rate identification system predicts which sectors the user device will pass through based on the indication of the route, and the time that the user device will pass through the sectors. The dynamic rate identification system may predict the sectors that the user device will pass through the sectors based on location data describing the sectors and the route obtained in act 801. The dynamic rate identification system may predict the time that the user device will pass through the sectors based on the route obtained in act 801 and one or more of: a time that the user device began travelling along the route, a current time, a projected time that the user device will begin travelling along the route, etc.

At act 805, the dynamic rate identification system generates a plurality of dynamic rates based on the prediction of which sectors the user device will pass through and the prediction of the time that the user device will pass through the sectors. At act 807, the dynamic rate identification system determines which types of data the user devices should transmit or receive while travelling along the route based on the plurality of dynamic rates and the predictions obtained in act 803. In some embodiments, act 807 is performed by using the process 700 described above in connection with FIG. 7.

After act 807, the process ends. In some embodiments, the dynamic rate identification system changes one or more of: the route and the time that the user device begins travelling along the route, based on the plurality of dynamic rates to determine new dynamic rates. For example, the dynamic rate identification system may attempt to determine lower dynamic rates for the user device as it travels along the route.

Figure 9:
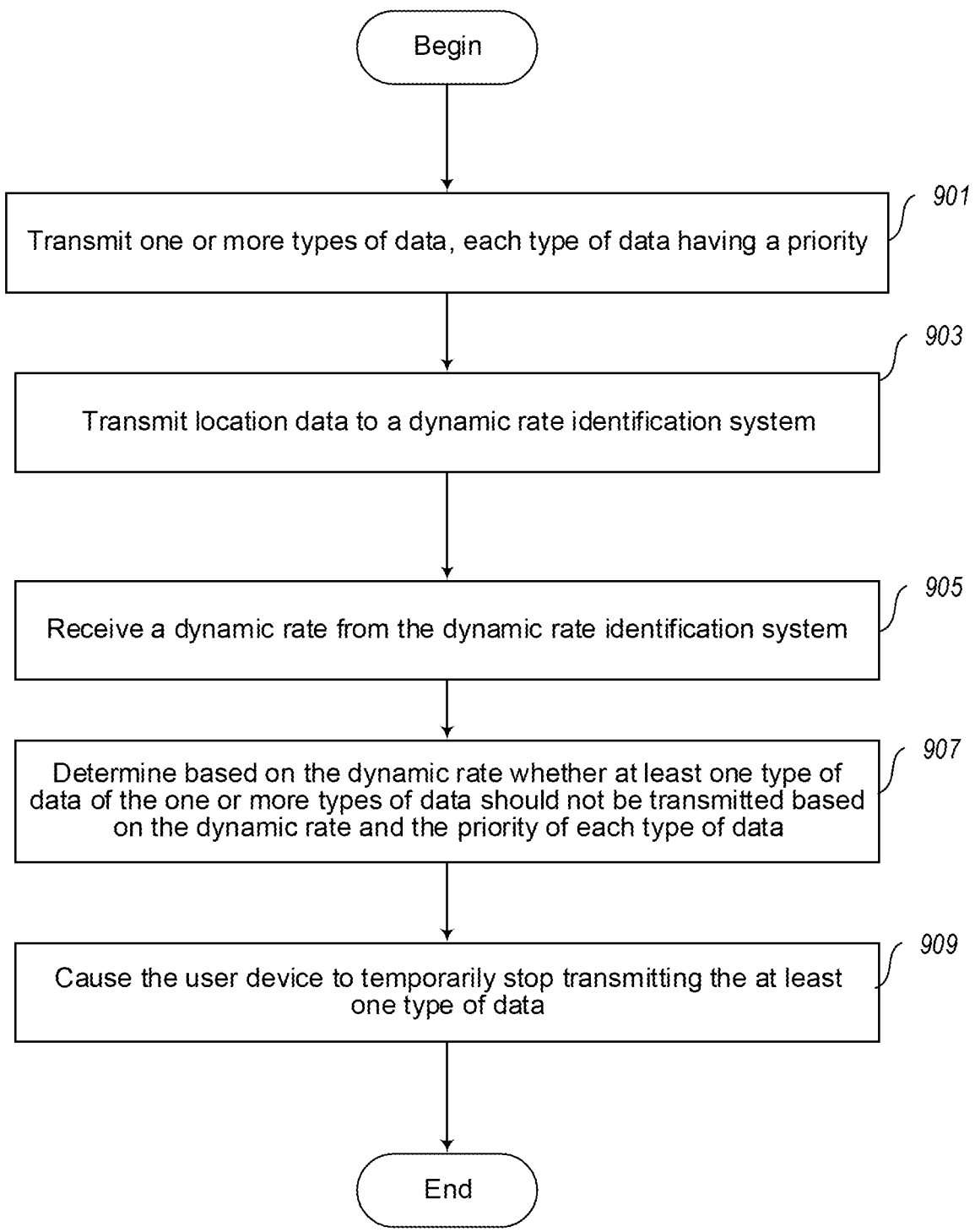
FIG. 9 is a flow diagram depicting a process for a user device to receive a dynamic rate and stop transmitting at least one type of data, according to various embodiments described herein.

FIG. 9 is a flow diagram depicting a process for a user device to receive a dynamic rate and stop transmitting at least one type of data, according to various embodiments described herein. The process described in FIG. 9 may be performed by a dynamic rate identification system, such as the dynamic rate identification system 200. First, at act 901, the user device transmits or receives one or more types of data, each type of data having a priority measure.

At act 903, the user device transmits location data to a dynamic rate identification system. In some embodiments, the user device transmits data indicating the one or more types of data transmitted or received by the user device to the dynamic rate identification system. At act 905, the user device receives a dynamic rate from the dynamic rate identification system.

At 907, the user device determines, whether at least one type of data of the one or more types of data should not be transmitted based on at least the dynamic rate and the priority of each type of data. At act 909, the user devices causes itself to temporarily stop transmitting the at least one type of data. In some embodiments, act 909 is performed similarly as act 709.

After act 909, the process ends.

Figure 10:
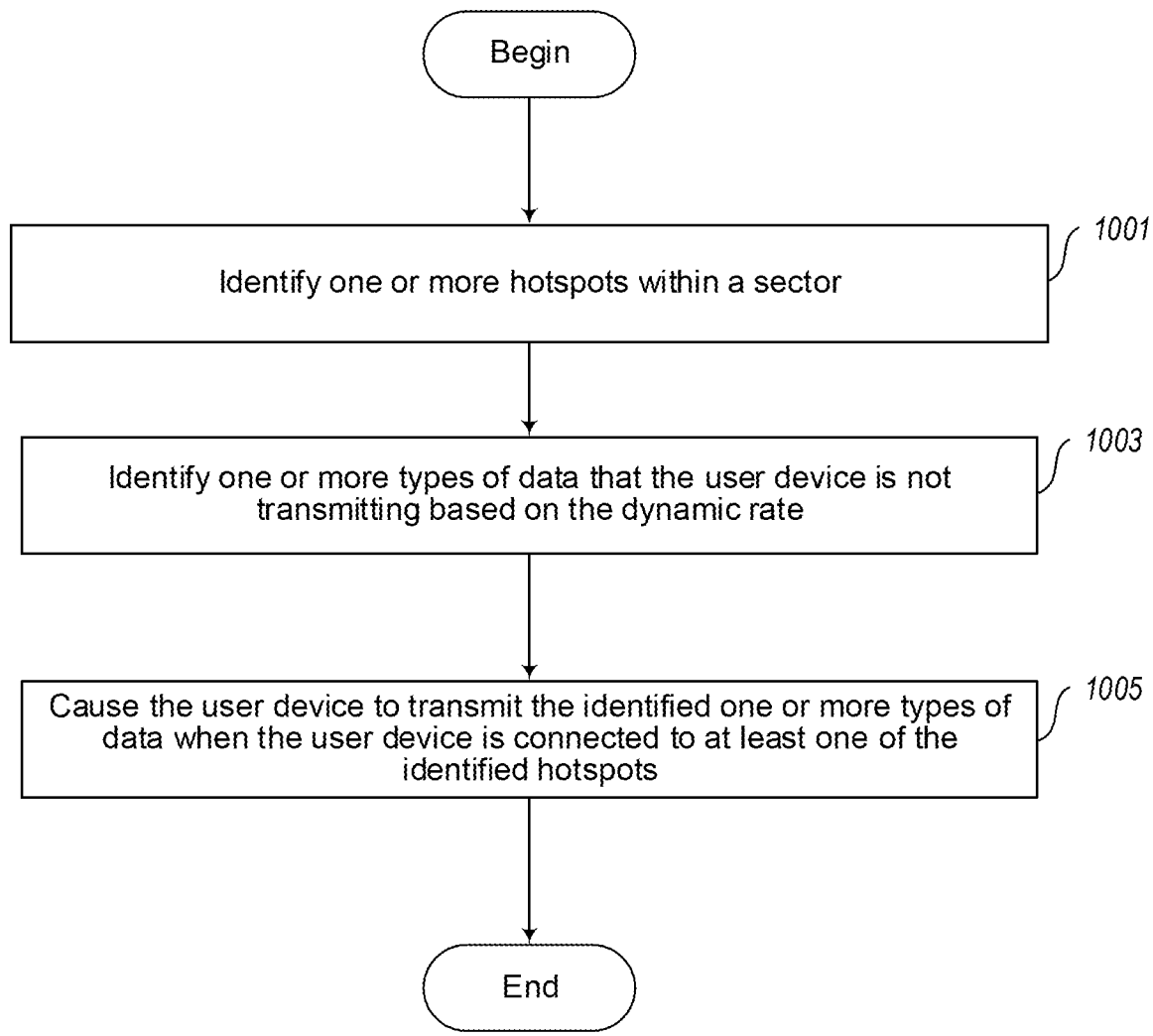
FIG. 10 is a flow diagram depicting a process to use a hotspot within a sector to transmit data which a user device is not transmitting based on a dynamic rate, according to various embodiments described herein.

FIG. 10 is a flow diagram depicting a process to use a hotspot within a sector to transmit data which a user device is not transmitting based on a dynamic rate, according to various embodiments described herein. The process described in FIG. 10 may be performed by a dynamic rate identification system, such as the dynamic rate identification system 200. First, at act 1001, the dynamic rate identification system identifies one or more hotspots within a sector. The hotspots may be identified based on one or more of: prior hotspots that a user device has connected to, a home network of a user associated with a user device, partnerships with one or more third party entities which have agreed to provide hotspots, or other methods of identifying a hotspot.

At act 1003, the dynamic rate identification system identifies one or more types of data that the user device is not transmitting or receiving based on the dynamic rate. The dynamic rate identification system may receive an indication of the type of data that the user device is not transmitting from the user device.

At act 1005, the dynamic rate identification system may cause the user device to transmit or receive the identified one or more types of data when the user device is connected to at least one hotspot within the sector. The dynamic rate identification system may cause the user device to transmit or receive the identified one or more types of data by performing one or more of: providing the one or more identified hotspots to the user device and providing instructions to the user device to only transmit or receive the identified types of data when the user device is connected to at least one of the identified hotspots.

After act 1005, the process ends.

The following is an example implementation of the dynamic rate identification system when applied to a vehicle. While the following example relates to a vehicle, any user device may be used in the example. In a typical network environment, network providers manage the SIM cards, control the wireless connection, and provide pricing based on a rate card, with volume discounts based on consumption tiers. The rate cards are periodically renegotiated and the rate is "locked-in" to the network provider based on the SIM card and the limitations of a modem included in a vehicle.

In contrast, the dynamic rate identification system uses dynamic pricing of network resources as a function of the time, location, and price per unit of capacity, based on real-time network utilization. These three dimensions shift based on the service level requirements of the vehicle. The dynamic rate identification system is able to optimize the total cost of connectivity by considering the time of day, location of the vehicle, and the network load.

In this example, the network provided by the network provider may be equivalent to a "gigabyte factory" which has a fixed cost. Further, the network may have an average utilization of less than twenty-five percent based on the geography of the coverage area, customer density, time of utilization, etc. The utilization and efficiency of the network is increased by the dynamic rate identification system by using a dynamic rate determined by the dynamic rate identification system. The dynamic rate may be linked to a specific location of any connected device and the current time of day, such as the vehicle in this example.

The network has varying loads throughout a day, and the density of consumption of network services may be variable based on the geography of the area serviced by the network and the time of the day. The dynamic rate identification system is able to consider an aggregate of the network load, individual sectors of the network load, etc.

The dynamic rate identification system is thereby able to optimize the on-vehicle storage and movement of vehicle-generated data based on service requirements for the vehicle data. The service requirements may be determined based on input from a manufacturer of the vehicle, a user of the vehicle, the network provider, etc. This input may take the form of a priority measure used to determine which data is the highest priority to transmit or receive. In this example, the highest priority data is then able to always be transmitted and received, while relatively unimportant or low priority data is transmitted or received when the network load or utilization is low. By optimizing the movement and storage of data, the dynamic rate identification system may cause the vehicle to take advantage of the network when the calculated dynamic rate is lower as opposed to moving large amounts of data during peak hours in sectors with heavy utilization.

The dynamic rate identification system uses intertemporal and interspatial price discrimination with dynamic adjustment due to demand for network resources to determine the dynamic rate. Thus, users of the network are able to experience a lower overall cost structure for certain service tiers of the network.

Figure 11:
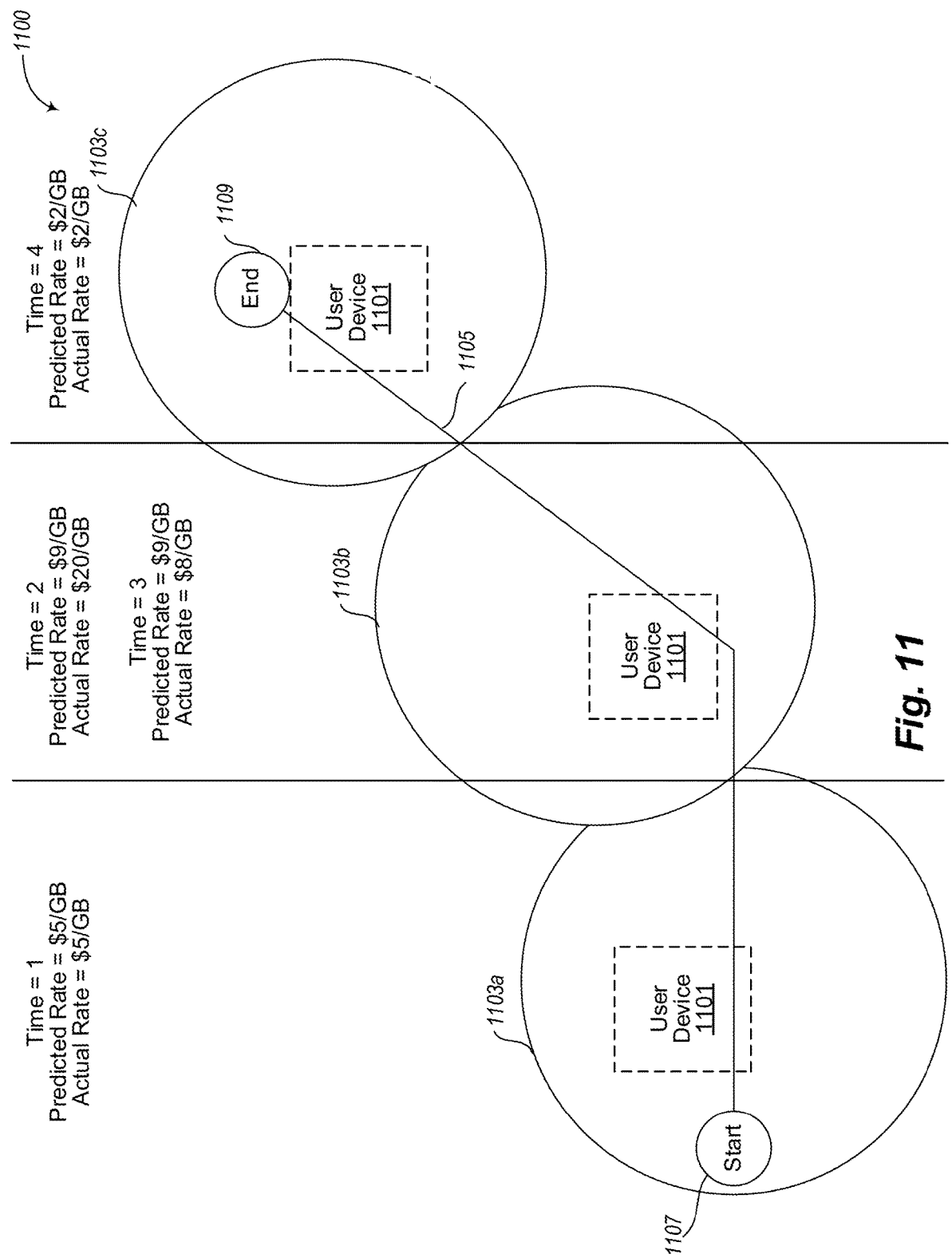
FIG. 11 is a diagram depicting an example of using a dynamic rate identification system to apply new dynamic rates to data transmitted from or received by a user device as it travels along a route, according to various embodiments described herein.

FIG. 11 is a diagram depicting an example 1100 of using a dynamic rate identification system to apply new dynamic rates to data transmitted from or received by a user device as it travels along a route, according to various embodiments described herein. The example 1100 includes a user device 1101, one or more sectors 1103a-1103c, a path 1105, a starting point 1107, and an ending point 1109. The user device 1101 may be a user device, such as the user device 101 described above in connection with FIG. 1. The one or more sectors 1103a-1103c may be network sectors, such as the sectors 103a-103c described above in connection with FIG. 1. In this example, a user device 1101 travels along the path 1105, and a new dynamic rate may be calculated for the user device 1101 as it travels along the path 1105. The path 1105 may be a route, a trajectory, or another type of course along which a user device may travel.

In the example 1100, the dynamic rate identification system receives an indication of the path 1105, along which the user device 1101 will travel. In some embodiments, the dynamic rate identification system also receives a time at which the user device 1101 will travel along the route. The dynamic rate identification system identifies the sectors 1103a-1103c as sectors which the user device will pass through as it travels along the route, and calculates a predicted dynamic rate for the user device for each sector. The predicted dynamic rate is a prediction of the rate at which the user device will be charged to use networking services. The predicted dynamic rate for a particular sector may be based on one or more of: a network load, such as a predicted network load, current network load, etc., for the sector; and a predicted time that the user device will be located in the sector. The dynamic rate identification system may use the predicted dynamic rate to determine which types of data are transmitted at certain times along the route travelled by the user device.

In the example 1100, the dynamic rate identification system has predicted that the path 1105 travelled by the user device will result in a predicted rate of $5 per gigabyte at a first time, $9 per gigabyte at a second and third time, and $2 per gigabyte at a fourth time. The dynamic rate identification system may use these predicted rates to preliminarily instruct the user device to stop or resume transmitting or receiving certain types of data at those times. These preliminary instructions may change based on changes in the dynamic rate as the user device travels along the path 1105.

In the example 1100, at a first period of time, the user device 1101 is present in sector 1103a. At the first time, the dynamic rate identification system has predicted that the rate will be $5 per gigabyte. Based on this rate, the dynamic rate identification system has determined that the user device 1101 should stop transmitting or receiving low priority data. The dynamic rate identification system calculates a dynamic rate for the user device as it enters the sector 1103a and determines which types of data the user device should stop or resume transmitting or receiving. As seen in the example 1100, at time "1," while the user device is in sector 1103a, the dynamic rate is calculated at $5 per gigabyte. The dynamic rate identification system may use this rate to determine which types of data the user device 1101 should stop or resume transmitting or alter the preliminary instructions given to the user device. Because the actual rate and predicted rate are the same, the dynamic rate identification system allows the user device 1101 to follow the preliminary instructions and the user device 1101 is caused to stop transmitting and receiving low priority data.

At a second period of time which is after the first period of time, the user device 1101 has travelled along the route and is present in sector 1103b. At this second time, the predicted rate is $9 per gigabyte, and it has been determined that the user device should only transmit or receive medium or high priority data. However, the actual dynamic rate is calculated at $20 per gigabyte because the network in sector 1103b is experiencing unusually high network loads. At this rate, it is determined that the user device should stop transmitting and receiving any data that isn't of the highest priority, even though the predicted rate indicated that the user device should be able to transmit medium priority data in this sector at the second time. As a result, at the second time, the user device is caused to stop receiving and transmitting any data that isn't of the highest priority.

At a third period of time that is after the second period of time, while the user device 1101 is still present in sector 1103b and the network load is lower than it was at the second time, the actual dynamic rate may be calculated again to change to $8 per gigabyte, compared to the predicted rate of $9 per gigabyte. The dynamic rate identification system predicted that the user device 1101 would be able to transmit or receive medium priority data, and because the actual rate is lower, the user device 1101 is still able to transmit or receive the medium priority data. Thus, at this rate the user device 1101 is able to resume transmitting and receiving medium priority data, and the user device 1101 is caused to do so.

Finally, at a fourth period of time after the third period of time, the user device 1101 has travelled to sector 1103c, which is experiencing a low network load at this time. The dynamic rate identification system predicted that sector 1103c would experience a low network load at this time, resulting in a predicted rate of $2 per gigabyte, which is used to determine that the user device can transmit and receive any type of data regardless of priority. The actual dynamic rate is also calculated to be $2 per gigabyte, and it is determined that the user device is able to follow the preliminary instructions to transmit and receive any type of data at this rate. Thus, at the fourth time, the user device is caused to resume transmission and reception of all types of data regardless of priority.

In some embodiments, the dynamic rate identification system may use the predicted dynamic rates to: preliminarily plan when the user device is able to transmit or receive certain types of data; when the user device should transmit or receive large amounts of certain types of data based on their priority (such as ensuring that large amounts of low priority data is transmitted when the dynamic rate is low, ensuring that no low priority data is transmitted when the dynamic rate is high, etc.); alter the route based on predicted dynamic rates for other sectors in order to ensure the dynamic rate does not exceed a certain threshold dynamic rate; or use the predicted dynamic rates in other manners which affect one or more of: the network load of one or more sectors, the price paid by a user for networking services provided to a user device and the ability of the user device to transmit or receive certain types of data. In some embodiments, the dynamic rate identification system calculates an actual dynamic rate when the user device enters a sector, and the actual dynamic rate is used to determine which types of data the user device should stop or resume transmitting or receiving. In some embodiments, the dynamic rate identification system periodically adjusts the dynamic rate for the user device.

In an example embodiment, one or more user devices, such as the user device 1101, are drones. In such an embodiment, a new dynamic rate is applied to the drone as the drone moves throughout sectors, such as the sectors 1103a, 1103b, and 1103c. Furthermore, the dynamic rate may be calculated based on the altitude of the drone. For example, a delivery drone may have a different dynamic rate applied when taking off, when traveling at a certain altitude, and when landing. Thus, the dynamic rate may be calculated based on three-dimensional movement of the user device.

In some embodiments, one or more user devices, such as the user device 1101, are robots or other automated equipment, such as mining equipment, construction equipment, autonomous vehicles, or other robotic or autonomous equipment. For example, a mining robot may have various sensors which collect data related to whether a mine is safe for humans to enter, moving the mining robot within a mine or worksite, or other data related to the functionality of such a robot. The mining robot may receive a dynamic rate during the day which is higher than a dynamic rate during the night. Thus, the mining robot may transmit high volumes of data which is critical, such as data related to the safety of the mine regardless of the dynamic rate, but may transmit other non-critical data when the dynamic rate is lower, such as during the night. Furthermore, it may be determined that the mining robot should be used at night to take advantage of the lower dynamic rate for transmitting or receiving data related to the movement of the mining robot, which may require high volume of data transmission and reception.

Figure 12:
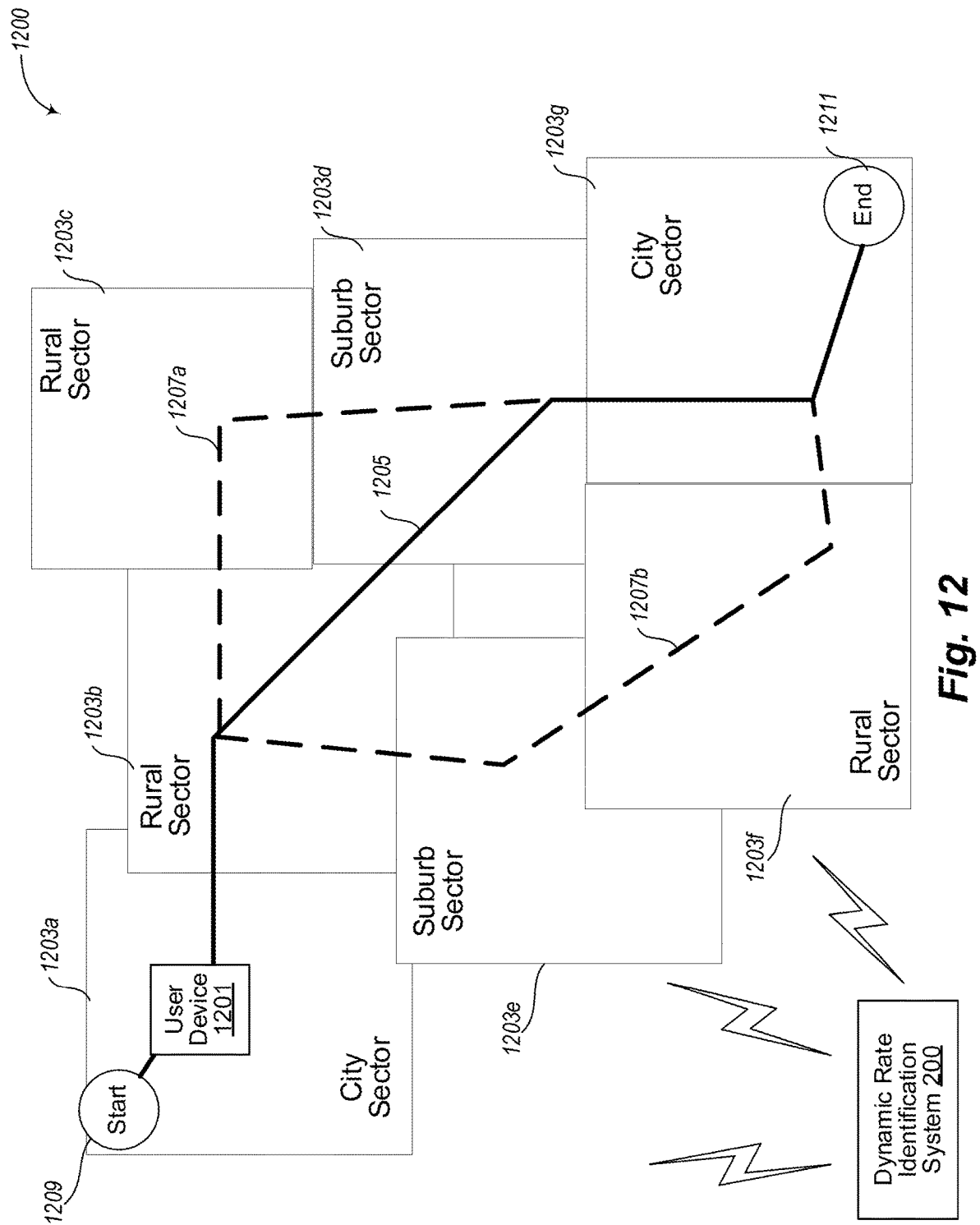
FIG. 12 is a diagram depicting an example of a dynamic rate identification system generating dynamic rates for a user device based on a route along which the user device travels, according to various embodiments described herein.

FIG. 12 is a diagram depicting an example 1200 of a dynamic rate identification system generating dynamic rates for a user device based on a route along which the user device travels, according to various embodiments described herein. The example 1200 includes a user device 1201, one or more sectors 1203a-1203g (collectively "sectors 1203"), a planned route 1205, one or more alternate routes 1207a and 1207b (collectively "alternative routes 1207"), a start point 1209, an end point 1211, and a dynamic rate identification system 200. The user device 1201 may be similar to the user device 101 described above in connection with FIG. 1. The dynamic rate identification system 200 in the example 1200 may be similar to the dynamic rate identification system 200 described above in connection with FIG. 2. Accordingly, the dynamic rate identification system 200 in FIG. 2 may employ embodiments described herein with respect to FIG. 12.

In the example 1200, the user device 1201 is projected to travel along the planned route 1205 from the start point 1209 to the end point 1211. In some embodiments, the start point 1209 may be the current location of the user device 1201 along the route 1205. In other embodiments, the start point 1209 may be a starting location of the route 1205 from when the route 1205 was selected. As the user device 1201 travels along the planned route 1205 the user device 1201 is expected to pass through multiple sectors 1203, such as the sectors 1203a, 1203b, 1203d, and 1203g. The dynamic rate identification system 200 generates, for each of the sectors 1203a, 103b, 1203d, and 1203g a dynamic rate for the user device 1201. The dynamic rate is generated based on at least the type of data that the user device 1201 is predicted to transmit, the projected load of each sector, and the time that the user device 1201 will spend within each of the sectors that the user device 1201 passes through as it travels the planned route 1205.

The planned route may be determined by the user device, a dynamic rate identification system, or any a device other than the user device. The planned route 1205 may be a projected route of the user device 1201, such as a route projected based on one or more of a speed, location, direction, travel history, or other factors used to project or predict the route of a device.

For example, a user device which is located on, or near train tracks, is travelling along the train tracks, and is moving at the speed of a train is likely travelling a route on a train. The route that the train travels, which can be obtained from an operator of the train, location data of train tracks, etc., can then be determined to be the projected route of the user device. In another example, a user device that is travelling along the highway may be determined to have two possible locations based on the location history of the user device. In this example, two projected routes may be generated, one for each location. In a third example, a user device may transmit an indication of a route generated by the user device for the dynamic rate identification system to use as the planned route 1205. In some embodiments, a user device or the system 200 obtains the planned route from another device, such as a vehicle head unit, a third party mapping application, or other devices from which a route may be obtained. In some embodiments, the dynamic rate may change in real-time, periodically, etc., in a similar manner as described above in connection with FIG. 11.

Additionally, in some embodiments, the dynamic rate identification system may determine that the user device 1201 is traveling through a network sector if the user device 1201 is projected to use networking resources provided in the network sector without physically being located within the geographic area of the network sector. For example, if the user device 1201 is travelling just outside of the network sector, but is still able to use the networking resources provided in the network sector, the user device 1201 may be considered to be travelling through the network sector.

In another example, the dynamic rate identification system may receive data describing one or more of: a speed of the user device; a current location of the user device; traffic or other obstacles that the user device may encounter along the planned route 1205; or other data describing the manner, speed, or other factors which may affect the amount of time that a user device may need to travel along a route. The dynamic rate identification system may use this data to predict or project where and when a user device may be. This prediction may be used to determine an estimated time period during which the user device will be located within a network sector, an estimated time period during which the user device will be using or accessing resources provided in a network sector, or other determinations regarding where or when a user device may access networking resources provided in a network sector.

Furthermore, in the example 1200 each of the sectors 1203 are labeled as a city sector, suburb sector, or rural sector. In the example 1200, a city sector, such as sectors 1203a and 1203g, is more likely to have a higher network load throughout the day than the rural sectors or suburb sectors. Additionally, the suburb sectors, such as the suburb sectors 1203d and 1203e, are more likely to have a higher network load than the rural sectors in the evening and early morning hours, but may have a similar network load to the rural sectors during the afternoon and late morning. Finally, the rural sectors, such as sectors 1203b, 1203f, and 1203c, are the least likely to have a higher network load than the suburb sectors and city sectors at any time of day. Although this ratio of sector loads is provided as an example in the example 1200, embodiments are not so limited, and any sector may have a higher or lower load than other sectors based on: the time of day, day of the week, or time of year; the network usage in the sector; the type of telecommunications equipment deployed in the sector; or other factors that may affect network load within a telecommunication network sector.

The example 1200 additionally includes alternate routes 1207, which are each alternate routes that the dynamic rate identification system may provide to the user device 1201. The alternate routes 1207 may be determined by the dynamic rate identification system based on projected network loads for each sector, as well as the dynamic rates predicted for the user device 1201. Thus, the dynamic rate identification system 200 may redirect the user device 1201 through sectors other than those included in the planned route 1205 in order to ensure that the network load does not exceed a threshold limit in one or more of the sectors included in the planned route 1205.

For example, the dynamic rate identification system 200 may determine that the dynamic rate for the user device 1201 is ten dollars per gigabyte in sector 1203a, four dollars per gigabyte in sector 1203b, six dollars per gigabyte in sector 1203d, and fifteen dollars per gigabyte in sector 1203g, based on the planned route 1205 and the times that the user device 1202 will be traveling through those sectors. However, the dynamic rate identification system may also determine that by travelling through sector 1207a, the user device would be located in sector 1203d and 1203g after peak network usage times, thus the price per gigabyte in those sectors may be four dollars and ten dollars respectively. As a result, by taking the alternate route 1207a, the user device 1201 may have a lower overall rate to transmit data as it travels from the start point 1209 to the end point 1211. Additionally, causing the user device to follow the alternate route reduce the overall network load at the peak times in the suburb sector 1203d and city sector 1203g because, although the total travel time for the user device 1201 may be longer, the user device 1201 would be located in those sectors after the peak network load hours.

In another example, the dynamic rate identification system 200 determines that the user device should travel an alternate route based on the type of data that the user device 1201 is projected to transmit as it travels from the start point 1209 and the end point 1211. If the user device 1201 is projected to transmit high priority data, large amounts of data, or a combination thereof, the dynamic rate identification system 200 determines one or more alternative routes, such as the alternative routes 1207, that would allow the user device 1201 to transmit the data at a lower dynamic rate than the planned route 1205. Alternatively, if the user device is not projected to transmit high priority data or large amounts of data, the dynamic rate identification system 200 may provide the user device 1201 with the fastest possible route.

In the example 1200, the dynamic rate identification system 200 may cause the user device 1201 to travel along the planned route 1205 or one of the alternative routes 1207. The dynamic rate identification system 200 may cause the user device 1201 to travel one of the routes by transmitting an indication of the route to the user device 1201, transmitting an indication of the dynamic rates for each route which will be applied to data transmitted by the user device to the user device 1201, transmitting instructions to the user device 1201 to display at least one of the routes to a user, transmitting instructions to the user device 1201 which cause the user device to change its movement based on at least one of the routes, or other methods of causing a user device to travel along a route. In some embodiments, causing the user device to travel along a route includes providing options to a user of the user device to select and follow one or more routes.

Figure 13:
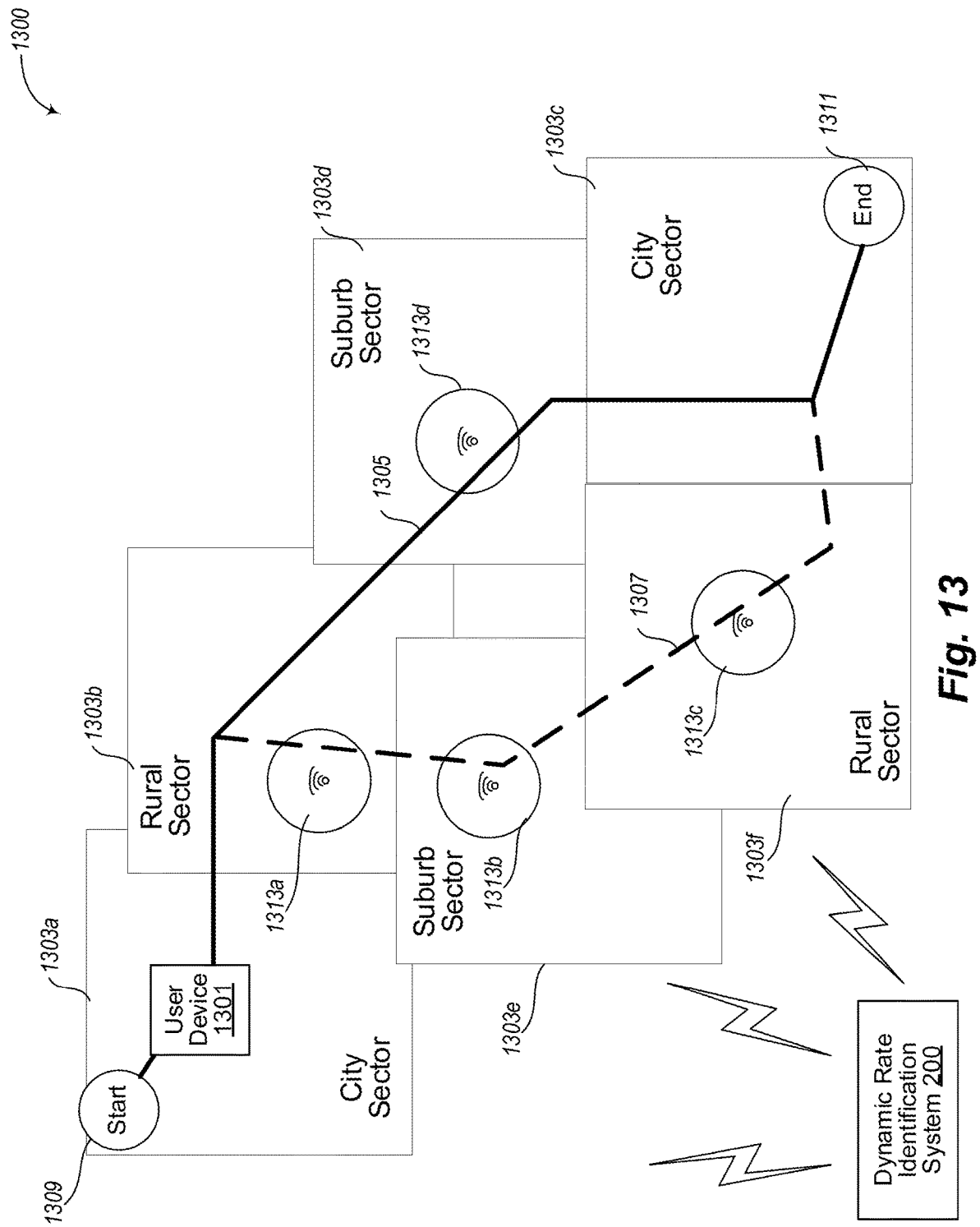
FIG. 13 is a diagram depicting an example of a dynamic rate identification system identifying hotspots for use by a user device, according to various embodiments described herein.

FIG. 13 is a diagram depicting an example 1300 of a dynamic rate identification system identifying hotspots for use by a user device, according to various embodiments described herein. The example 1300 includes a user device 1301, one or more sectors 1303a-1303f (collectively "sectors 1303"), a planned route 1305, an alternate route 1307, a start point 1309, an end point 1311, one or more hotspots 1313a-1313d (collectively "hotspots 1313"), and a dynamic rate identification system 200. The user device 1301, sectors 1303, planned route 1305, alternate route 1307, start point 1309, end point 1311, and dynamic rate identification system 200 may be similar to the user device 1201, sectors 1203, planned route 1205, alternate routes 1207, start point 1209, end point 1211, and dynamic rate identification system 200, respectively, described above in connection with FIG. 12. The hotspots 1313 may be determined by using the process 1000 described above in connection with FIG. 10. As described above, the dynamic rate identification system 200 is able to cause a user device to travel along an alternate route in a similar manner as described above in connection with FIG. 12.

In the example 1300, the user device 1301 is projected to travel along the planned route 1305 from the start point 1309 to the end point 1311. The dynamic rate identification system may use the planned route to determine whether one or more hotspots, such as the hotspots 1313, are available to be used by the user device 1301 to transmit or receive data, such as user device data. In some embodiments, the user device 1301 uses hotspots to transmit or receive some or all of the user device data when the user device is located within a geographic area within which it is able to access or connect to a hotspot. Transmitting data may include transmitting a request to receive data. Receiving data may include receiving a request to transmit data.

For example, a portion of user device data may be classified as low priority data, while another portion of the user device data may be classified as high priority data. The dynamic rate identification system 200 may instruct the user device 1301 not to transmit low priority data when the user device 1301 is travelling along the planned route 1305. The dynamic rate identification system 200 may additionally instruct the user device 1301 to transmit at least the low priority data when the user device 1301 is connected to a hotspot, such as the hotspot 1313d. The user device 1301 may transmit the low priority data via the hotspot while it is connected to the hotspot. In some embodiments, the user device 1301 halts the transmission of the low priority data when it disconnects from the hotspot. The user device 1301 may resume the transmission of low priority data after connecting to another hotspot or when the dynamic rate has fallen below a selected threshold rate.

Furthermore, in some embodiments, the dynamic rate identification system 200 may determine one or more alternate routes, such as the alternate route 1307, based on at least the availability of one or more hotspots for use by the user device 1301, such as the hotspots 1313. For example, the dynamic rate identification system 200 may determine an alternate route based on the availability of hotspots and the dynamic rates of sectors available for use by the user device 1301 along the alternate route. As can be seen in the example 1300 travelling along the alternate route 1307 allows the user device 1301 to access three hotspots, the hotspots 1313*a*, 1313*b*, and 1313*c*. The user device 1301 may use the three hotspots along the alternate route 1307 to transmit low priority user device data when the dynamic rate in the sectors corresponding to the hotpots exceed a selected threshold.

In some embodiments, the alternate route determined by the dynamic rate identification system 200 may pass through one or more routes that the planned route 1305 passes through. For example, the dynamic rate identification system 200 may determine that additional hotspots may be accessible to the user device 200 within one or more network sectors within which the planned route intersects. Based on that determination, the dynamic rate identification system 200 may generate an alternate route which allows the user device 200 to access hotspots for a greater amount of time than if the user device 200 travelled along the planned route 1305. In various embodiments, the dynamic rate identification system 200 may cause the user device 200 to travel along the route 1305 or the alternate route 1307 based on a comparison of aggregated rates and hotspots along each route. The aggregated rates and hotspots along a specific route may be calculated based on an aggregation of dynamic rates of the network sectors within which the specific route intersects and the number or availability of hotspots along the specific route. In this way, the features described in conjunction with FIG. 12 can be combined with the features described in conjunction with FIG. 13 to select between the route 1305 or the alternate route 1307 and cause the user device 200 to travel along the selected route.

In some embodiments, the dynamic rate identification system 200 accesses hotspot data describing a plurality of hotspots to which the user device can connect or access. The hotspot data may include one or more of: credentials for the user device to access a hotspot; a geographic area or range within which a user device can access a hotspot; network characteristics of a hotspot, such as bandwidth of the hotspot, connection speed of the hotspot, or other network characteristics of the hotspot; an indication of the user devices which can access the hotspot; or other data that describes a hotspot. In some embodiments, the hotspot data is included in a repository of hotspot data accessible by the dynamic rate identification system 200. In some embodiments, the dynamic rate identification system 200 determines whether a user device is able to access or connect to the hotspot based on the hotspot data. In some embodiments, the plurality of hotspots include hotspots with which a user device, such as the user device 1301, has connected or accessed in the past, hotspots with which a user device other than the user device 1301 has connected or accessed in the past, hotspots identified by the dynamic rate identification system 200, or other hotspots.

For example, the dynamic rate identification system 200 may determine that a hotspot used as a home network for a user other than a user of the user device 1301 is within range for the user device 1301 to access. The dynamic rate identification system 200 may determine whether the user device 1301 is allowed to access the hotspot, such as by determining whether login credentials are available to be shared with the user device 1301. In another example, the hotspot may be a public hotspot, such as a hotspot which is a part of a public network provided by a government entity. The dynamic rate identification system 200 may determine that the user device 1301 is able to access the public hotspot based on the hotspot data, and may transmit any data needed to connect to the hotspot to the user device 1301.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
    at least one processor;
    at least one memory coupled to the at least one processor, the memory having computer-executable instructions stored thereon that, when executed by the at least one processor, cause the system to:
        receive an indication of a route for a user device;
        identify one or more network sectors that the route passes through; and
        for each respective network sector of the one or more network sectors:
            determine a time period during which the user device will be located within the respective network sector based on the route;
            identify a cost for networking services to be provided to the user device based on the time period at which the user device will be located within the respective network sector, wherein to identify the cost for networking services the system is caused to:
                access historical data regarding the network load for the respective network sector;
                predict, based on the historical data and the time period, a future network load for the respective network sector; and
                determine the cost for the networking services based on the predicted future network load for the respective network sector;
            determine a dynamic rate for the user device to access the networking services based on the cost for networking services for the respective network sector; and
            cause the user device to transmit user device data when the user device is located within the respective network sector based on the dynamic rate.

2. The system of claim 1, wherein the computer-executable instructions, when executed by the at least one processor to cause the user device to transmit user device data based on the dynamic rate, further cause the processor to:
    receive an indication of the type of user device data predicted to be transmitted by the user device;
    receive a priority level of the user device data; and cause the user device to transmit the user device data based on the dynamic rate when the user device is located within the respective network sector and the priority level of the user device data.

3. The system of claim 1, wherein the computer-executable instructions, when executed by the at least one processor, further cause the processor to:
  determine, based on the indicated route, one or more alternate routes;
  for each respective alternate route of the one or more alternate routes:
    determine one or more dynamic rates for the user device to access networking services in each sector through which the respective alternate route passes through;
    determine whether the user device should follow at least one alternate route of the one or more alternate routes or the indicated route, based on the dynamic rates determined for the at least one alternate route and the dynamic rates determined for the indicated route; and
    based on the determining, cause the user device to follow the at least one alternate route or the indicated route.

4. The system of claim 1, wherein the indication of a route comprises a start point for the route and an end point for the route, and wherein the computer-executable instructions, when executed by the at least one processor, further cause the processor to:
  generate a path for the user device to travel from the start point to the end point based on the start point, the end point, and the dynamic rates for each of the one or more network sectors.

5. The system of claim 4, wherein the computer-executable instructions, when executed by the at least one processor to generate the path, further cause the processor to:
  receive an indication of the user device data predicted to be transmitted by the user device;
  receive a priority level of the user device data; and
  generate the path based on the start point, the end point, the dynamic rates, the user device data, and the priority level of the user device data.

6. The system of claim 1, wherein the computer-executable instructions, when executed by the at least one processor to cause the user device to transmit user device data based on the dynamic rate, further cause the processor to:
  identify one or more network resources within the respective network sector which will be used by the user device to access the network at the determined time period; and
  before the determined time period occurs, provision the identified network resources for use by the user device, such that the identified network resources are available for use when the user device is located within the respective network sector.

7. The system of claim 1, wherein a network sector represents a geographic area within which a network is able to provide networking services to user devices.

8. A method comprising:
  receiving an indication of a route for a user device;
  identifying one or more network sectors located along the route;
  for each respective network sector of the one or more network sectors:
    determining a time at which the user device will be transmitting user device data within the respective network sector based on the route;
    identifying a cost for networking services to be provided to the user device based on the time at which the user device will be transmitting user device data within the respective network sector by:
      accessing historical data regarding the network load for the respective network sector;
      predicting, based on the historical data and the determined time, a future network load for the respective network sector; and
      determining the cost for the networking services based on the predicted future network load for the respective network sector;
    determining a dynamic rate for the user device to access the networking services within the respective network sector based on the cost for networking services; and
    determining whether user device data should be transmitted when the user device is transmitting user device data within the respective network sector based on the dynamic rate;
  in response to determining that the user device data should be transmitted within the respective network sector, causing the user device to transmit the user device data when the user device is transmitting within the respective network sector.

9. The method of claim 8, wherein causing the user device to transmit user device data further comprises:
  receiving an indication of the user device data predicted to be transmitted by the user device while the user device travels along the route;
  receiving a priority level of the user device data; and
  causing the user device to transmit the user device data based on the dynamic rate when the user device is transmitting within the respective network sector and the priority level of the user device data.

10. The method of claim 8, further comprising:
  determining, based on the indicated route, one or more alternate routes;
  for each respective alternate route of the one or more alternate routes:
    determining one or more dynamic rates for the user device to access networking services in each sector included in the respective alternate route;
    determining whether the user device should follow at least one alternate route of the one or more alternate routes or the indicated route, based on the dynamic rates determined for the at least one alternate route and the dynamic rates determined for the indicated route; and
    based on the determining, causing the user device to follow the at least one alternate route or the indicated route.

11. The method of claim 8, wherein causing the user device to transmit user device data based on the dynamic rate further comprises:
  identifying one or more network resources within the respective network sector which will be used by the user device to access the network at the determined time; and
  before the determined time occurs, provisioning the identified network resources for use by the user device, such that the identified network resources are available for use when the user device is transmitting within the respective network sector.

12. A non-transitory processor-readable storage medium that stores at least one of instructions or data, the instructions or data, when executed by at least one processor, cause the at least one processor to:
- receive an indication of a route for a user device;
- identify one or more network sectors with which the route intersects;
- for each respective network sector of the one or more network sectors:
  - determine a time period during which the user device will be located within the respective network sector based on the route;
  - identify a cost for networking services to be provided to the user device based on the time period at which the user device is projected to be located within the respective network sector by:
    - accessing historical data regarding the network load for the respective network sector;
    - predicting, based on the historical data and the time period, a future network load for the respective network sector; and
    - determining the cost for the networking services based on the predicted future network load for the respective network sector;
  - determine a dynamic rate for the user device to access the networking services based on the cost for networking services; and
  - facilitate the transmission of user device data based on the dynamic rate when the user device is located within the respective network sector.

13. The non-transitory processor-readable storage medium of claim 12, wherein the indication of a route comprises a start point for the route and an end point for the route, and wherein the at least one processor is further caused to:
- generate a path for the user device to travel from the start point to the end point based on the start point, the end point, and the dynamic rates for each of the one or more network sectors.

14. The non-transitory processor-readable storage medium of claim 13, wherein to generate the path the at least one processor is further caused to:
- receive an indication of the user device data predicted to be transmitted by the user device;
- receive a priority level of the user device data; and
- generate the path based on the start point, the end point, the dynamic rates, the user device data, and the priority level of the user device data.

15. The non-transitory processor-readable storage medium of claim 13, wherein to generate the path the at least one processor is further caused to:
- identify one or more network resources within the respective network sector which will be used by the user device to access the network at the determined time period; and
- before the determined time period occurs, provision the identified network resources for use by the user device, such that the identified network resources are available for use when the user device is located within the respective network sector.

16. The non-transitory processor-readable storage medium of claim 13, wherein to generate the path the at least one processor is further caused to:
- determine, based on the indicated route, one or more alternate routes;
- for each respective alternate route of the one or more alternate routes:
  - determine one or more additional network sectors based on the respective alternate route;
  - determine one or more dynamic rates for the user device to access networking services in each network sector of the one or more additional network sectors;
  - determine whether the user device should follow at least one alternate route of the one or more alternate routes or the indicated route, based on the dynamic rates determined for the at least one alternate route and the dynamic rates determined for the indicated route; and
  - based on the determining, cause the user device to follow the at least one alternate route or the indicated route.

\* \* \* \* \*